(12) United States Patent
Tabata

(10) Patent No.: US 10,830,998 B2
(45) Date of Patent: Nov. 10, 2020

(54) IMAGING LENS AND IMAGING DEVICE HAVING THE SAME

(71) Applicants: Nanchang O-FILM Optical-Electronic Tech CO., LTD, Nanchang (CN); O-FILM. Japan Co., Ltd., Tokyo (JP)

(72) Inventor: Tomio Tabata, Tokyo (JP)

(73) Assignees: NANCHANG O-FILM OPTICAL-ELECTRONIC TECH CO., LTD, Jiangxi (CN); O-FILM. JAPAN CO., LTD., Tokyo (JP)

( * ) Notice: Subject to any disclaimer, the term of this patent is extended or adjusted under 35 U.S.C. 154(b) by 97 days.

(21) Appl. No.: 16/236,427

(22) Filed: Dec. 29, 2018

(65) Prior Publication Data

US 2019/0265440 A1 Aug. 29, 2019

(30) Foreign Application Priority Data

Feb. 26, 2018 (JP) .................................. 2018-031438

(51) Int. Cl.
*G02B 13/18* (2006.01)
*G02B 13/00* (2006.01)
(Continued)

(52) U.S. Cl.
CPC ......... *G02B 13/0045* (2013.01); *G02B 5/208* (2013.01); *G02B 9/60* (2013.01); *G02B 13/0085* (2013.01)

(58) Field of Classification Search
CPC .... G02B 13/0045; G02B 13/18; G02B 5/208; G02B 9/60; G02B 13/00; G02B 5/20
See application file for complete search history.

(56) References Cited

U.S. PATENT DOCUMENTS 7,864,454 B1 1/2011 Tang et al.
2004/0223070 A1* 11/2004 Shirasuna ............ G02B 15/173
348/335

(Continued)

FOREIGN PATENT DOCUMENTS

CN 106371193 A 2/2017
EP 3531180 A1 8/2019
(Continued)

OTHER PUBLICATIONS

Examiner provided machine translation of Lee, KR 20070103553 A (Year: 2007).*

(Continued)

*Primary Examiner* — Balram T Parbadia
(74) *Attorney, Agent, or Firm* — Franklin & Associates International Inc

(57) ABSTRACT

An imaging lens includes, in order from an object side to an image side, a first lens having two surfaces both being convex aspheric surfaces; a second lens being aspherical and having a negative refractive power; a third lens being aspherical and having a positive refractive power; a fourth lens being aspherical and having a negative refractive power; and a fifth lens being aspherical, the fifth lens having a concave rear surface facing the image side on the optical axis, the rear surface having an inflection point at a position near its circumference, the fifth lens having a front surface facing the object side, the front surface having a smaller curvature than any other lens surface, and the fifth lens serves also as an infrared cut filter; wherein the imaging lens satisfies the following conditions: (1) TTL/2ih<0.85; and (2) 0.7<ih/f<1.1.

5 Claims, 13 Drawing Sheets

(51) Int. Cl.
*G02B 5/20* (2006.01)
*G02B 9/60* (2006.01)

(56) References Cited

U.S. PATENT DOCUMENTS

| | | | |
|---|---|---|---|
| 2008/0137030 A1* | 6/2008 | Hoffman | G02C 7/104 |
| | | | 351/159.24 |
| 2012/0243108 A1 | 9/2012 | Tsai et al. | |
| 2014/0049839 A1 | 2/2014 | Shinohara | |
| 2014/0098239 A1 | 4/2014 | Jeong | |
| 2015/0124333 A1 | 5/2015 | Noda et al. | |
| 2015/0177483 A1 | 6/2015 | You | |
| 2016/0004046 A1* | 1/2016 | Asami | G02B 13/18 |
| | | | 359/713 |
| 2016/0131899 A1 | 5/2016 | Jo | |
| 2016/0139368 A1 | 5/2016 | You | |
| 2016/0231532 A1 | 8/2016 | Huang et al. | |
| 2016/0231537 A1 | 8/2016 | Kubota et al. | |
| 2016/0241753 A1 | 8/2016 | Jhang et al. | |
| 2016/0282587 A1 | 9/2016 | Hashimoto | |
| 2017/0023769 A1 | 1/2017 | Jo | |
| 2017/0045717 A1 | 2/2017 | Park | |
| 2017/0059828 A1 | 3/2017 | Sekine et al. | |
| 2017/0235111 A1* | 8/2017 | Hashimoto | G02B 9/62 |
| | | | 359/713 |
| 2019/0049699 A1 | 2/2019 | Tabata | |
| 2019/0064485 A1 | 2/2019 | Arita | |

FOREIGN PATENT DOCUMENTS

| | | |
|---|---|---|
| JP | 2013182090 A | 9/2013 |
| JP | 2016114803 A | 6/2016 |
| TW | 201608268 A | 3/2016 |
| TW | 201641987 A | 12/2016 |

OTHER PUBLICATIONS

European Search Report and Opinion dated Jan. 7, 2019 issued on European Patent Application EP18176026 in the name of Nanchango-Film Optical-Electronic Tech Co., Ltd, eight (8) pages.

Office Action dated Oct. 26, 2018; Taiwanese Patent Application No. 107121950.

Office Action dated Sep. 18, 2019 on Taiwanese Patent Application No. 107121949.

European Search Report and Opinion dated Jan. 10, 2019 issued on European Patent Application EP18176034 in the name of Nanchang O-Film Optical-Electronic Tech Co., Ltd, nine (9) pages.

Herbert Gross, "Handbook of Optical Systems, vol. 3: Aberration Theory and Correction of Optical Systems", Handbook of Optical Systems, vol. 3, Wiley-VSH, six (6) pages.

Non-Final Office Action dated Dec. 27, 2019, issued on U.S. Appl. No. 16/037,129 entitled "Imaging Lens and Imaging Apparatus" in the name of Nanchang O-film Optical-Electronic Tech Co Ltd.

European Search Report dated Jul. 12, 2019 on European Patent Application No. 18207537.4, filed Nov. 21, 2018 in the name of O-FILM. Japan Co., Ltd.

\* cited by examiner

IMAGING LENS AND IMAGING DEVICE HAVING THE SAME

CROSS-REFERENCE TO RELATED APPLICATION

This application claims priority to Japanese Patent Application No. 2018031438 entitled "IMAGING LENS AND IMAGING DEVICE HAVING THE SAME" filed on Feb. 26, 2018, the contents of which is expressly incorporated herein by reference in its entirety.

TECHNICAL FIELD

The present disclosure relates to an imaging lens and an imaging device having the imaging lens.

BACKGROUND

With the reduction in thickness of the mobile information terminal represented by the smartphone or the like and the increase in the number of pixels of the camera mounted on the mobile information terminal, it is desired that the imaging lens incorporated in such a camera having a small thickness and a large caliber.

For example, in Patent Document 1, an imaging lens composed of four lenses in which various kinds of aberrations are well corrected is proposed.

Further, for example, in Patent Document 2, an imaging lens composed of four lenses is proposed, the total field of view of which being a wide angle of 80° or more while the total length being relatively short.

Patent Document 1: Japanese Patent No. 5818702
Patent Document 2: Japanese Patent No. 5667323

However, to realize a large caliber of the imaging lens is to realize a brightness lower than F2.2 or even lower than F2.0. At the same time, with the increase in the number of pixels of the camera, a high resolution (i.e., good correction for various kinds of aberrations) is also required.

In the imaging lens described in Patent Document 1, since the back focal length is sufficiently long and the curvature of field is corrected, the TTL (total length) of a four-piece single focus lens is relatively long. In order to facilitate the reduction in thickness of the mobile terminal, a small-sized imaging element having a larger F number and a small number of pixels has to be used.

In the imaging lens described in Patent Document 2, since the depth becomes small as the caliber becomes larger, the deterioration in resolution due to insufficient correction for the curvature of field becomes remarkable.

As a result, in the conventional imaging lens, it is difficult to achieve high performance in aberration and imaging performance while achieving a small thickness and a large caliber thereof.

SUMMARY

Therefore, it is an object of the present disclosure to achieve high performance in aberration and imaging while achieving a small thickness and a large caliber in the imaging lens.

An imaging lens that solves the above problem includes, a first lens having two surfaces both being convex aspheric surfaces; a second lens being aspherical, the second lens having a concave surface facing the image side and having a negative refractive power; a third lens being aspherical, the third lens having a convex surface facing the image side and having a positive refractive power; a fourth lens being aspherical, the fourth lens having a concave surface facing the image side on an optical axis and having an inflection point at a position near its circumference, and having a negative refractive power; and a fifth lens being aspherical, the fifth lens having a concave rear surface facing the image side on the optical axis, the rear surface having an inflection point at a position near its circumference, the fifth lens having a front surface facing the object side, the front surface having a smaller curvature than any other lens surface, and the fifth lens serves also as an infrared cut filter, wherein the imaging lens satisfies the following conditions:

$$TTL/2ih < 0.85; \text{ and} \qquad (1)$$

$$0.7 < ih/f < 1.1 \qquad (2)$$

wherein TTL is a distance from the object side of the first lens to the image plane on the optical axis; ih is a maximum image height; and f is a focal length of the entire imaging lens system.

Since the imaging lens described above includes a fifth lens that also serves as an infrared cut filter, there is no need to insert another infrared cut filter into the space between the lens and the sensor. As a result, the back focal length of the lens can be shortened, and a small thickness and a large caliber can be easily achieved. Moreover, since the ratio of the image height to the focal length of the entire system is optimized while the ratio of the total length to the image height is optimized, high performance in aberration and imaging performance can also be achieved.

In one of the embodiments, the fifth lens serves as the infrared cut filter by the material thereof, or by providing an infrared cut layer on a front surface thereof.

When the fifth lens serves as an infrared cut filter by the material of the fifth lens, it has a greater homogeneity of the infrared cut function in the direction perpendicular to the optical axis. When where the fifth lens serves as an infrared cut filter by an infrared cut layer, it has good manufacturability and greater freedom in choosing infrared cut layers, and the like.

In one of the embodiments, the fifth lens is a composite lens composed of a substrate portion on the object side and an aspheric lens portion on the image side. As a result, the function as an infrared cut filter and the function as a correction optical system that achieves high performance in aberration and imaging performance can be achieved by the substrate portion and the aspheric lens portion.

An imaging device that solves the above problem includes an imaging lens, and an imaging element configured to convert an optical image obtained from the imaging lens into an electrical signal; the imaging lens including: in order from an object side to an image side, a first lens having two surfaces both being convex aspheric surfaces; a second lens being aspherical, the second lens having a concave surface facing the image side and having a negative refractive power; a third lens being aspherical, the third lens having a convex surface facing the image side and having a positive refractive power; a fourth lens being aspherical, the fourth lens having a concave surface facing the image side on an optical axis and having an inflection point at a position near its circumference, and having a negative refractive power; and a fifth lens being aspherical, the fifth lens having a concave rear surface facing the image side on the optical axis, the rear surface having an inflection point at a position near its circumference, the fifth lens having a front surface facing the object side, the front surface having a smaller curvature than any other lens surface, and the fifth lens serves also as an infrared cut filter, wherein the imaging lens satisfies the following conditions:

$$TTL/2ih < 0.85; \text{ and} \quad (1)$$

$$0.7 < ih/f < 1.1 \quad (2)$$

wherein TTL is a distance from the object side of the first lens to the image plane on the optical axis; ih is a maximum image height; and f is a focal length of the entire imaging lens system.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

Figure 1:
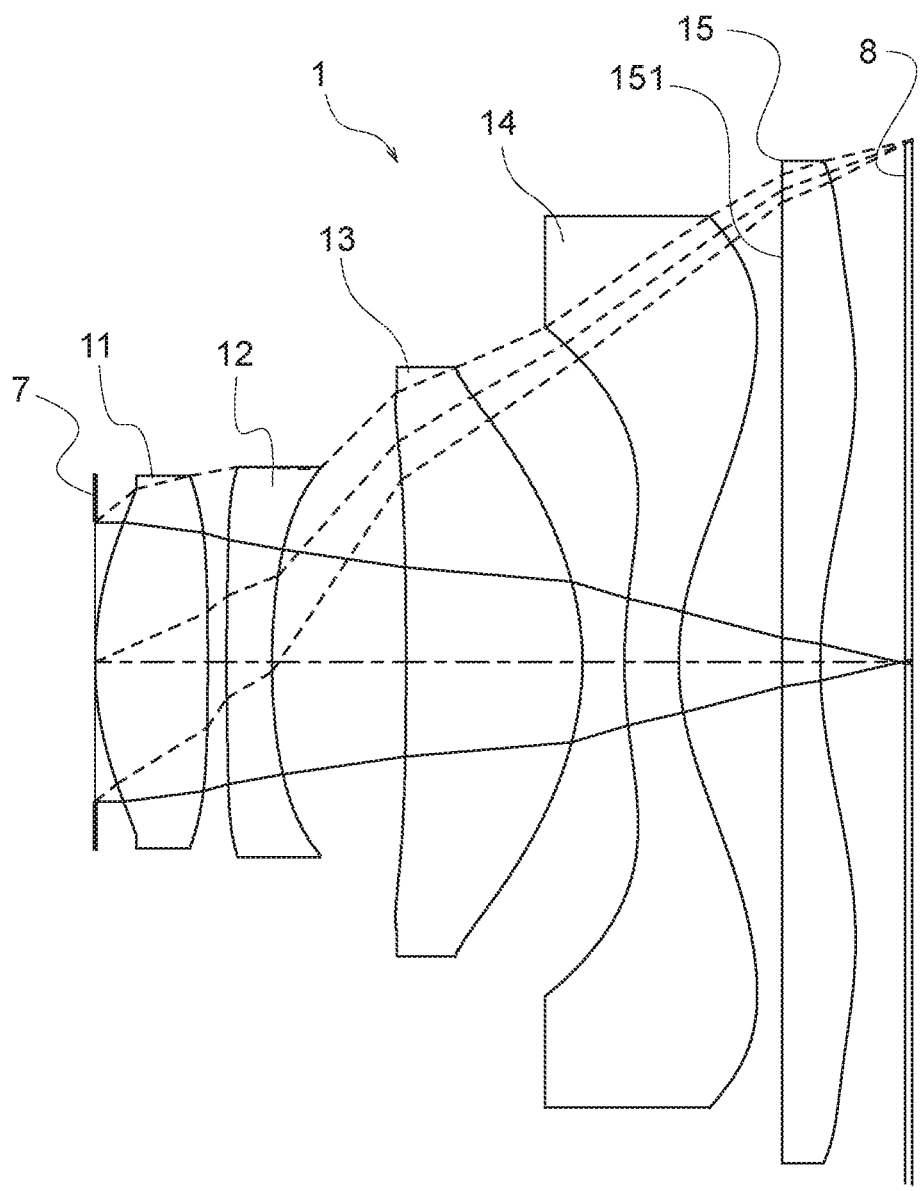
FIG. 1 shows a lens configuration of an imaging lens in a first embodiment.

DESCRIPTION OF THE REFERENCE NUMERALS 1, 2, 3, 4, 5, 6, 105 . . . imaging lens;
11, 21, 31, 41, 51, 61 . . . the first lens;
12, 22, 32, 42, 52, 62 . . . the second lens;
13, 23, 33, 43, 53, 63 . . . the third lens;
14, 24, 34, 44, 54, 64 . . . the fourth lens;
15, 25, 35, 45, 55, 65 . . . the fifth lens;
151, 251, 351 . . . infrared cut layer;
453, 553, 653 . . . infrared cut film;
451, 551, 651 . . . glass substrate;
452, 552, 652 . . . lens portion

DETAILED DESCRIPTION OF PREFERRED EMBODIMENTS

Embodiments of the present disclosure will be described below.

[Configuration of the Imaging Lens]

The imaging lens according to an embodiment includes, sequentially arranged from an object side to an image side: a first lens having two opposite surfaces both being convex aspheric surfaces; a second lens being aspherical, the second lens having a concave surface facing towards the image side and having negative refractive power; a third lens being aspherical, the third lens having a convex surface facing towards the image side and having positive refractive power; a fourth lens being aspherical, the fourth lens having a concave surface facing towards the image side on an optical axis and having an inflection point at a position near its circumference, and having negative refractive power; and a fifth lens being aspherical, the fifth lens having a concave rear surface facing towards the image side on the optical axis, the rear surface having an inflection point at a position near its circumference, the fifth lens having a front surface facing towards the object side, the front surface having a smaller curvature than that of any other lens surfaces of the image lens, and the fifth lens serves also as an infrared cut filter.

In other words, the imaging lens is configured in a five-lens configuration of positive, negative, positive, negative, and negative. The first lens is a double convex aspheric lens, the second lens and the third lens are aspheric lenses, and the fourth lens and the fifth lens are aspheric lenses having an inflection point.

Further, the fifth lens in the imaging lens also serves as an infrared cut filter. In a conventional imaging device, an infrared cut filter is provided between the imaging lens and the imaging surface. Therefore, a long back focal length is required in a conventional imaging lens, which is unfavorable for the reduction in thickness of the imaging lens. On the contrary, in the imaging lens of the embodiment, a short back focal length and a small thickness can thus be realized.

Further, light transmission properties of the fifth lens are described as follows: the light transmittance is half value (50%) at any wavelength in a wavelength range of 380 nm to 430 nm, and is 80% or more in a wavelength range of 500 nm to 600 nm, and is 10% or less in a wavelength range of 730 nm to 800 nm.

Further, the front surface of the fifth lens facing towards the object side is a surface with a curvature smaller than any other lens surface. For the shape of the front surface, a plane can be typically employed. When the front surface of the fifth lens is a small curvature surface as described above, it is possible for the rear surface of the fifth lens, which is the last surface of the imaging lens, to have both the function to correct the curvature of field and distortion aberration remaining in the lens group consisting of the first lens to the fourth lens, and the function to correct the chief ray angle (hereinafter referred to as CRA) of the sensor.

If the distance between a correction surface for correcting the curvature of field and the distortion aberration and the imaging surface is too long (for example, assuming that the front surface of the fifth lens is the correction surface and the rear surface is a small curvature surface), the area of the light passing through the correction surface will become larger. In that case, since the correction surface of the fifth lens has an increasing effect on the correction of the curvature of field and the distortion aberration, and the occurrence of the coma aberration cannot be ignored, the shape accuracy tolerance required for the aspherical shape of the correction surface will be very strict. However, since a short design of the back focal length can be realized in the aforementioned imaging lens, the shape accuracy tolerance of the fifth lens in correcting the curvature of field and the distortion aberration will be relaxed.

In addition, in order to perform the correction of the CRA, the angle of the light emitted from the rear surface of the fourth lens is adjusted on the correction surface. However, if the distance between the correction surface and the imaging surface is too long (for example, assuming that the front surface of the fifth lens is a correction surface and the rear surface is a small curvature surface), it is necessary to generate a considerable distortion aberration on the lens group consisting of the first lens to the fourth lens. Therefore, particularly, the asphencity on the object side of the first lens to the fourth lens will be increased in the form of an exponential function, and the manufacture of the first lens to the fourth lens will become difficult. However, since a short design of the back focal length can be realized in the aforementioned imaging lens, the correction of the CRA can be realized.

Further, when the function of the infrared cut filter of the fifth lens is achieved by a filter layer provided by vapor deposition of metal multilayer film, spin coating of pigment, etc. For the homogenization of the layer, it is necessary to provide the filter layer on a small curvature surface. However, even though the filter layer is provided on the small curvature surface as described above, it is inevitable that the layer is more or less inhomogeneous due to the coating detachment, paint detachment, smearing, or the like.

Assuming that the front surface of the fifth lens is an aberration correction surface composed of an aspheric surface and the rear surface is a small curvature surface having the function of an infrared cut filter, since the distance between the filter layer and the imaging surface is too short, the ratio of "defect area/beam passing area" which is a standard for judging whether a black spot or the like is generated on the image will become larger, which is impractical in terms of manufacturing standards. However, in the aforementioned imaging lens, since the front surface of the fifth lens is a small curvature surface and the rear surface is a correction surface, the distance between the filter layer and the imaging surface is increased, and the ratio of "defect area/beam passing area" will become smaller.

Further, the imaging lens of the embodiment satisfies the following conditions:

$$TTL/2ih<0.85; \text{ and} \qquad (1)$$

$$0.7<ih/f<1.1 \qquad (2)$$

wherein TTL is a distance from the object side of the first lens to the image plane on the optical axis; ih is a maximum image height; and f is a focal length of the entire imaging lens system.

The condition (1) defines the ratio of the distance from the object side of the first lens to the image plane on the optical axis, which is generally referred to as an optical total length of an imaging lens, to the maximum image height.

If the imaging lens does not satisfy the condition (1), the maximum image height will become too small, or the optical total length will become too long. If the maximum image height becomes too small, the field of view of the imaging lens is insufficient, and the function as a wide-angle lens of the disclosure will be reduced. In addition, if the optical total length becomes too long, it will be difficult to realize a small thickness in the imaging lens.

The condition (2) defines the ratio of the maximum image height to the focal length of the entire imaging lens system (hereinafter, also referred to as "system focal length").

If ih/f of the condition (2) corresponding to the imaging lens is lower than the lower limit of the condition (2), the system focal length will become too long, or the maximum image height will become too small. If the system focal length becomes too long, the field of view tends to be insufficient, and the optical total length tends to be elongated, and it is difficult to realize a small thickness and a large caliber of the imaging lens. In addition, if the maximum image height becomes too small, it is difficult to realize a large caliber of the imaging lens as described above.

On the contrary, if ih/f of the condition (2) corresponding to the imaging lens is higher than the upper limit of the condition (2), the system focal length will become too short, or the maximum image height will become too large, and it is difficult to achieve high performance in aberration and imaging performance of the imaging lens.

Therefore, the imaging lens can realize a small thickness, a large caliber, and high performance in aberration and imaging performance by satisfying the conditions (1) and (2).

In an imaging lens according to an embodiment, the fifth lens described above may serve as an infrared cut filter by the material of the fifth lens, or by an infrared cut layer provided on the front surface thereof described above.

When the fifth lens serves as an infrared cut filter by the material of the fifth lens, the homogeneity of the infrared cut function of such a lens material in a direction perpendicular to the optical axis is greater than the homogeneity of an infrared cut layer. Therefore, compared with the case where the fifth lens serves as an infrared cut filter only by an infrared cut layer, the homogeneity of the infrared cut function in a direction perpendicular to the optical axis is improved when the fifth lens serves as an infrared cut filter completely or partially by the lens material of the fifth lens.

As the material having the function as an infrared cut filter, for example, blue glass or the like may be used. In this case, in order to optimize the spectral transmittance of blue glass to the camera system, an infrared cut layer formed of a vapor deposited metal film may be added to the front surface of the fifth lens.

On the other hand, when the fifth lens serves as an infrared cut filter by an infrared cut layer, it may have good manufacturability and greater freedom in choosing infrared cut layers, and the like. For example, the infrared cut layer may be a pigment layer formed by spin coating, metal film layers formed by vacuum evaporation, a pigment film coat, and the like.

Further, in an imaging lens according to an embodiment, the fifth lens described above is a composite lens composed of a substrate portion on the object side and an aspheric lens portion on the image side. When the fifth lens is such a composite lens, the function as an infrared cut filter and the function as a correction optical system that achieves high performance in aberration and imaging performance can be shared by the substrate portion and the aspheric lens portion.

Furthermore, the imaging lens according to an embodiment satisfies the following conditions (3) and (4):

$$1<f/f1234<1.3; \text{ and} \qquad (3)$$

$$-1.5 \leq f/f5 < 0 \qquad (4)$$

wherein f is a focal length of the entire imaging lens system; f1234 is a combined focal length of the first lens, the second lens, the third lens, and the fourth lens; and f5 is a focal length of the fifth lens.

The condition (3) defines the ratio of the focal length of the entire imaging lens system to the combined focal length of the composite optical system of the first lens to the fourth lens. When the value of f/f1234 in the condition (3) is approximately 1, the fifth lens will not affect the spherical aberration and the coma aberration of the composite optical system composed of the first lens to the fourth lens, which means that it is possible to effectively correct the curvature of field, the distortion aberration, and the CRA where the image height is relatively high caused by the aspheric surface of the fifth lens.

When the value of f/f1234 in the condition (3) is lower than the lower limit, the negative refractive power of the fifth lens will be lost, therefore when performing the correction of the curvature of field, it counteracts the correction of the distortion aberration and the CRA, thus it is difficult to achieve desired correction.

If the value of f/f1234 in the condition (3) is higher than the upper limit, the negative refractive power of the fifth lens will be too strong, the correction for the spherical aberration may be insufficient, and the performance of the imaging lens as a whole may be reduced.

The condition (4) defines the ratio of the focal length of the entire imaging lens system to the focal length of the fifth lens, and is a condition for ensuring the performance of the composite optical system composed of the first lens to the fourth lens on the front side with reference to the fifth lens.

If the value of f/f5 in the condition (4) is lower than the lower limit, the refractive power of the optical system composed of the front four pieces will become too large, the accuracy in manufacturing may be reduced.

If the value of f/f5 in the condition (4) is higher than the upper limit, the refractive power of the optical system composed of the front four lenses will become too small, thus the total length of the lens will become larger.

[Numerical Embodiments of the Imaging Lens]

Numerical embodiments obtained by applying specific numerical values to specific embodiments of the imaging lens will be described below with reference to the drawings and tables.

In addition, the meanings and the like of the marks shown in the following tables and descriptions are as follows.

"Sn" denotes the surface numbers sequentially assigned, from the object side to the image side, to the surfaces of the lenses constituting the imaging lens. The letter "R" denotes the radius of curvature of the corresponding surface. The letter "D" denotes the distance between the corresponding surface and the next adjacent surface in the above sequence on the optical axis (i.e., the thickness of the lens at the center portion thereof or the air spacing between the adjacent surfaces of the adjacent lenses). The letters "nd" denotes the refraction index of the each lens on the line d ($\lambda$=587.6 nm). The letters "v d" denotes the Abbe number of the each lens on the line d. The radius of curvature R being "$\infty$" indicates that the surface is a plane. The "optical elements", "L1", "L2", ..., "L5" respectively denote the first lens, the second lens, ..., and the fifth lens.

The letter "k" denotes the conic constant. The symbols "A3", "A4", "A5", ..., and "A20" respectively denote the 3rd order, the 4th order, the 5th order, ..., and the 20th order of aspherical coefficient.

Further, in each of the tables showing conic constants and aspherical coefficients, the expression of the numerical value is expressed by an index based on 10. For example, "0.12E-05" means "0.12×10$^{-5}$", and "9.87E+03" means "9.87×10$^{3}$".

In the imaging lens used in each embodiment, the lens surface may be formed to be aspherical. Taking the center point (apex of lens) of the lens surface as the origin, the distance in the direction parallel to the optical axis is denoted as "z", and the distance in the direction perpendicular to the optical axis is denoted as "r". Further, the paraxial curvature at the apex of the lens is denoted as "c", the conic constant is denoted as "k", and the 3rd order, the 4th order, the 5th order, ..., the 20th order of aspherical coefficients are respectively denoted as "A3", "A4", "A5", ..., "A20". In this way, the aspherical shape can then be defined by the following mathematical formula 1.

$$z = \frac{cr^2}{1 + SQRT\{1 - (1 + k)c^2 r^2\}} + A3r^3 + A4r^4 + A5r^5 \cdots + A20r^{20}$$

Mathematical Formula 1

The First Embodiment

FIG. 1 shows the lens configuration of an imaging lens 1 in the first embodiment.

The imaging lens 1 of the first embodiment includes, in order from the object side to the image side, a first lens 11 having a positive refractive power, a second lens 12 having a negative refractive power, a third lens 13 having a positive refractive power, a fourth lens 14 having a negative refractive power at the center of the lens and having an inflection point at a position away from the optical axis, and a fifth lens 15 having a negative refractive power at the center of the lens and having an inflection point at a position away from the optical axis. In the following description of each embodiment, the surface on the object side (the left side of the drawing) of each lens may be referred to as a "front surface", and the surface on the image side (the right side of the drawing) of each lens may be referred to as a "rear surface".

An aperture 7 with a fixed opening is provided on the object side of the first lens 11. The imaging surface of the imaging lens 1 is provided with an imaging element (image sensor) 8.

The fifth lens 15 in the first embodiment is a plastic lens, and the front surface of the fifth lens 15 is a plane. Further, an infrared cut layer 151 with pigment is formed on the front surface of the fifth lens 15 by spin coating.

The lens data of the numerical embodiment 1 obtained by applying specific numerical values to the imaging lens 1 of the first embodiment is shown in Table 1.

TABLE 1

| Optical element | S n | R(mm) | D(mm) | nd | vd |
|---|---|---|---|---|---|
| Aperture | 1 | $\infty$ | 0.000 | 1.00000 | 0.0 |
| L1 | 2 | 1.895 | 0.640 | 1.54390 | 56.0 |
|  | 3 | −49.462 | 0.108 | 1.00000 | 0.0 |
| L2 | 4 | 21.725 | 0.258 | 1.66130 | 20.4 |
|  | 5 | 3.885 | 0.763 | 1.00000 | 0.0 |
| L3 | 6 | −26.121 | 1.000 | 1.54390 | 56.0 |
|  | 7 | −1.573 | 0.239 | 1.00000 | 0.0 |
| L4 | 8 | 3.156 | 0.308 | 1.53460 | 56.2 |
|  | 9 | 1.569 | 0.588 | 1.00000 | 0.0 |
| L5 | 10 | $\infty$ | 0.217 | 1.61500 | 26.0 |
|  | 11 | 2.467 | 0.522 | 1.00000 | 0.0 |

In the imaging lens 1, among the ten lens surfaces (the 2nd surface to the 11th surface) of the first lens 11 to the fifth lens 15, each surface except the front surface of the fifth lens 15 (the 10th surface) is an aspheric surface.

The aspherical coefficient of the aspheric surface in the numerical embodiment 1 is shown together with the conic constant k in Table 2, Table 3, and Table 4.

TABLE 2

| Sn | K | A3 | A4 | A5 | A6 | A7 |
|---|---|---|---|---|---|---|
| 2 | −1.2734E+00 | −2.7030E−03 | 1.6518E−02 | −8.7438E−03 | −3.9883E−03 | −2.9941E−03 |
| 3 | 0.0000E+00 | −8.2564E−03 | −3.3832E−02 | −2.1369E−02 | −7.2873E−03 | −1.0788E−04 |
| 4 | 0.0000E+00 | 7.2144E−03 | −2.8714E−02 | 1.0798E−02 | −1.1613E−03 | 4.9723E−03 |
| 5 | 1.1041E+00 | 5.7379E−03 | 2.8334E−02 | 3.0583E−02 | −1.0648E−02 | 2.7861E−03 |
| 6 | 0.0000E+00 | 6.0524E−03 | 4.2009E−02 | −2.0887E−02 | 1.7770E−03 | 1.5126E−03 |
| 7 | −1.8213E+00 | 4.4200E−02 | −3.8279E−02 | 4.1828E−05 | 2.4540E−03 | 1.1510E−03 |
| 8 | 0.0000E+00 | 8.3929E−02 | −1.9791E−01 | 1.2322E−02 | 1.2867E−02 | 2.5073E−03 |
| 9 | −3.4831E+00 | 4.7384E−02 | −5.6678E−02 | −1.3698E−02 | 8.7945E−03 | 2.1043E−03 |
| 11 | −3.8636E+00 | −1.5863E−02 | −2.8930E−02 | 2.9892E−04 | 1.3070E−03 | 3.4219E−04 |

TABLE 3

| Sn | A8 | A9 | A10 | A11 | A12 | A13 |
|---|---|---|---|---|---|---|
| 2 | −7.0128E−03 | −4.1906E−03 | −6.8328E−03 | −2.6115E−03 | −1.9848E−03 | −5.6164E−04 |
| 3 | −1.9141E−03 | −4.7117E−04 | −2.9450E−03 | −1.7939E−03 | 2.6397E−03 | 2.5757E−03 |
| 4 | 6.7363E−03 | 6.0194E−03 | 4.5625E−03 | 3.2336E−03 | 1.9520E−03 | 5.6553E−04 |
| 5 | 1.1835E−03 | 9.0581E−03 | 3.5266E−03 | 1.8540E−03 | 2.1151E−03 | 4.0744E−04 |
| 6 | 5.4207E−03 | −4.3961E−04 | −5.3200E−04 | 1.2309E−03 | −6.4900E−04 | −8.3074E−04 |
| 7 | 3.4700E−04 | 1.7627E−04 | −4.4308E−04 | −1.2629E−04 | −7.0594E−05 | −5.1128E−05 |
| 8 | 9.2710E−05 | 2.2347E−04 | −8.2329E−04 | −2.6595E−04 | 1.0144E−04 | 9.5612E−05 |
| 9 | −6.1634E−05 | −1.8642E−04 | −7.0919E−05 | −1.9488E−05 | −2.5398E−06 | −7.2025E−07 |
| 11 | 4.9726E−05 | 1.7718E−05 | 4.9784E−06 | −4.5673E−07 | −1.8997E−07 | −1.1589E−07 |

TABLE 4

| Sn | A14 | A15 | A16 | A17 | A18 | A19 | A20 |
|---|---|---|---|---|---|---|---|
| 2 | 1.3485E−03 | 4.9574E−04 | 4.5795E−03 | | | | |
| 3 | 1.2631E−03 | 2.1374E−04 | −5.2717E−04 | | | | |
| 4 | −9.4054E−04 | −1.0076E−03 | −9.7223E−04 | −1.3436E−03 | −4.1463E−05 | −1.9035E−04 | 4.1787E−04 |
| 5 | −1.2658E−03 | −1.2767E−03 | −8.0200E−04 | −8.5246E−04 | −2.6099E−04 | −4.4196E−05 | 1.3828E−04 |
| 6 | 5.0699E−04 | 5.1554E−04 | 2.9463E−04 | 8.1066E−05 | −1.4675E−04 | −1.9909E−04 | 9.8622E−05 |
| 7 | 8.5165E−06 | 3.0044E−05 | 2.1096E−05 | 9.2443E−06 | 2.2204E−06 | 4.9581E−07 | −2.7637E−05 |
| 8 | 2.7707E−05 | 2.4611E−06 | −3.5643E−06 | −6.8110E−06 | −1.7480E−06 | 7.6489E−07 | 3.4152E−07 |
| 9 | 8.7000E−07 | 2.5809E−07 | 1.0119E−07 | 8.3274E−09 | −1.4700E−10 | −1.8668E−09 | −7.3234E−10 |
| 11 | −8.8233E−08 | −3.2681E−08 | −8.7480E−09 | −1.8588E−09 | −4.2314E−10 | 2.0506E−10 | 1.8432E−10 |

The system focal length f, the F number, the total field of view, the maximum image height, the optical total length (TTL) of the imaging lens 1, the focal length f1234 of the composite optical system of the first lens 11 to the fourth lens 14, and the focal length f5 of the fifth lens 15, according to the numerical embodiment, are shown in Table 5.

TABLE 5

| | |
|---|---|
| f(mm) | 3.61 |
| F number | 2.21 |
| Total field of view (°) | 78.0 |
| Maximum image height (mm) | 2.946 |
| TTL (mm) | 4.604 |
| f1234(mm) | 3.20 |
| f5(mm) | −4.01 |

According to Table 5, since TTL/2ih=0.781 in the numerical embodiment 1, the above condition (1) is satisfied.

Further, since ih/f=0.815 in the numerical embodiment 1 according to Table 5, the above condition (2) is satisfied.

Further, since f/f1234=1.13 in the numerical embodiment 1 according to Table 5, the above condition (3) is satisfied.

Further, since f/f5=−0.90 in the numerical embodiment 1 according to Table 5, the above condition (4) is satisfied.

Figure 2:
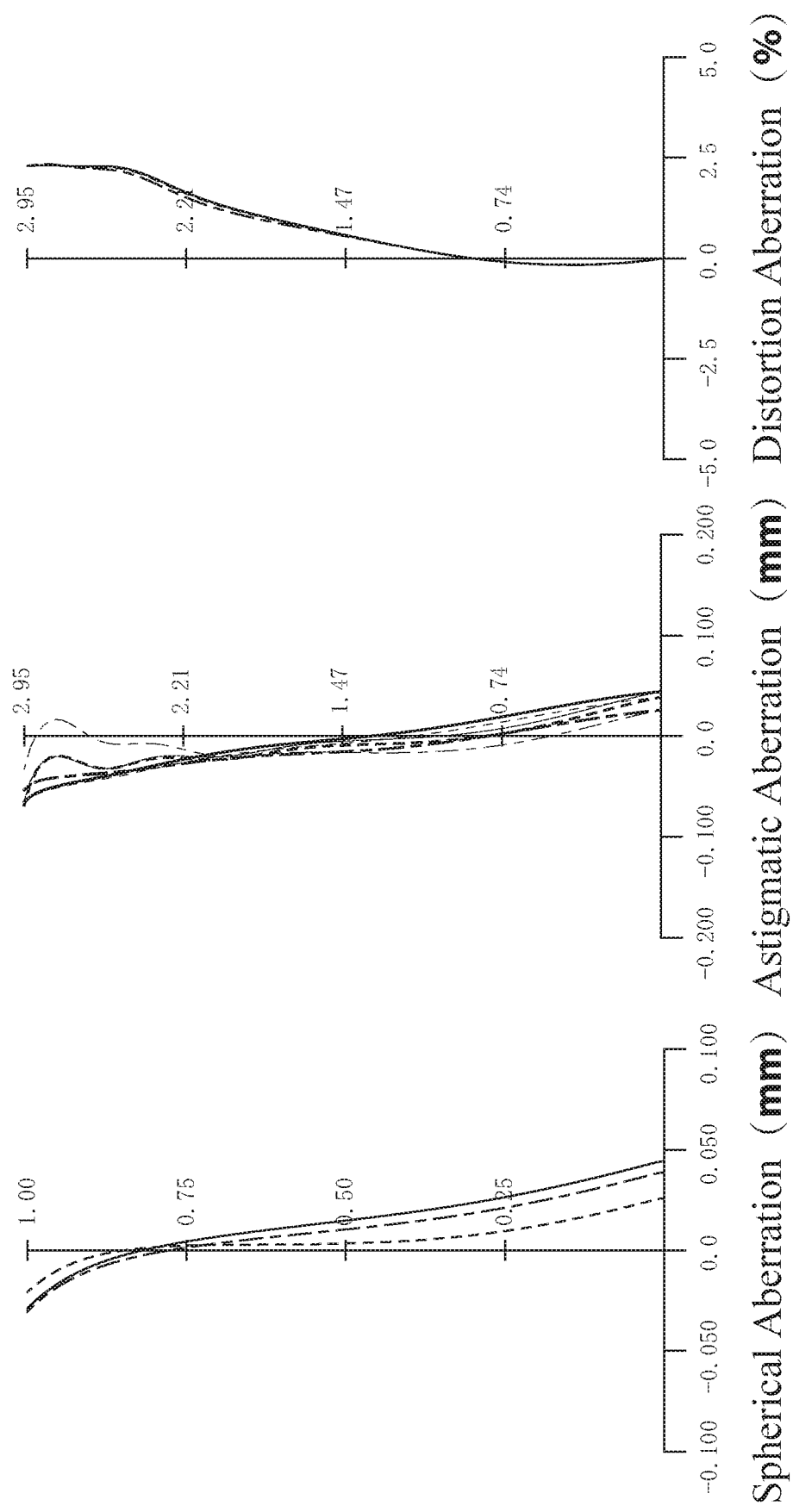
FIG. 2 shows various kinds of aberration diagrams in an infinity in-focus state of a numerical embodiment 1.

FIG. 2 shows various kinds of aberration diagrams in an infinity in-focus state of the numerical embodiment 1.

In FIG. 2, a spherical aberration diagram, an astigmatic aberration diagram, and a distortion aberration diagram are shown.

In the spherical aberration diagram, the astigmatic aberration diagram, and the distortion aberration diagram, the value on the line d (wavelength 587.6 nm) is shown by a dashed line, the value on the line g (wavelength 435.8 nm) is shown by a chain line, the value on the line C (wavelength 656.3 nm) is shown by a solid line. Further, in the astigmatic aberration diagram, the value on the sagittal image plane is shown by a thick line, and the value on the tangential image plane is shown by a thin line.

Further, in the distortion aberration diagram, the lines of the line d, the line g, and the line C are substantially coincident.

It can be inferred from the aberration diagrams that various kinds of aberrations in the numerical embodiment 1 are all well corrected, and excellent imaging performance is obtained.

The Second Embodiment

Figure 3:
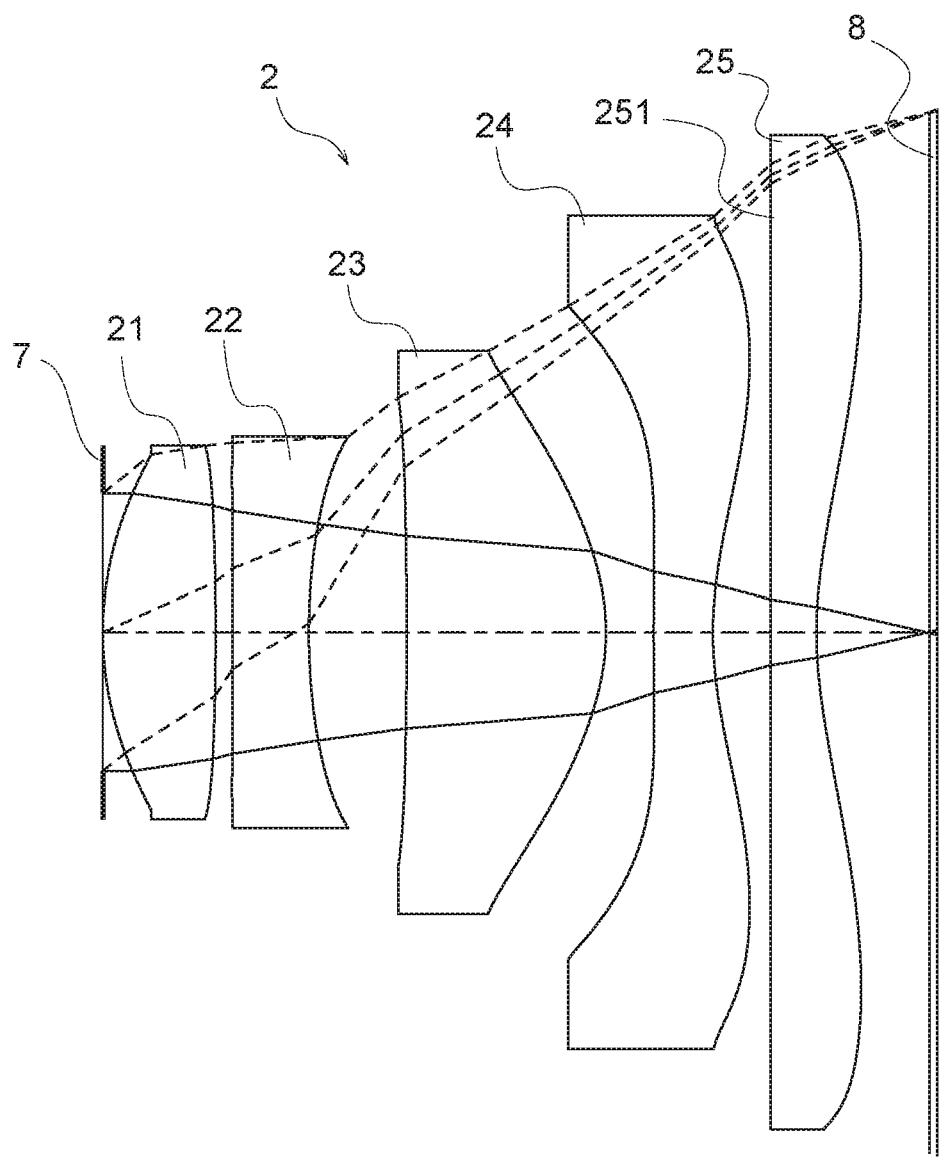
FIG. 3 shows a lens configuration of an imaging lens in a second embodiment.

FIG. 3 shows the lens configuration of an imaging lens 2 in the second embodiment.

The imaging lens 2 of the second embodiment includes, in order from the object side to the image side, a first lens 21 having a positive refractive power, a second lens 22 having a negative refractive power, a third lens 23 having a positive refractive power, a fourth lens 24 having a negative refractive power at the center of the lens and having an inflection point at a position away from the optical axis, and a fifth lens 25 having a negative refractive power at the center of the lens and having an inflection point at a position away from the optical axis.

An aperture 7 with a fixed opening is provided on the object side of the first lens 21. The imaging surface of the imaging lens 2 is provided with an imaging element (image sensor) 8.

The fifth lens 25 in the second embodiment is a lens made of ultraviolet curable resin, and the front surface of the fifth lens 25 is a plane. Further, an infrared cut layer 251 with pigment is formed on the front surface of the fifth lens 25 by spin coating.

The lens data of the numerical embodiment 2 obtained by applying specific numerical values to the imaging lens 2 of the second embodiment is shown in Table 6.

TABLE 6

| Optical element | S n | R(mm) | D(mm) | nd | vd |
|---|---|---|---|---|---|
| Aperture | 1 | ∞ | 0.000 | 1.00000 | 0.0 |
| L1 | 2 | 1.909 | 0.640 | 1.54390 | 56.0 |
|  | 3 | −17.178 | 0.096 | 1.00000 | 0.0 |
| L2 | 4 | −1234.885 | 0.433 | 1.66130 | 20.4 |
|  | 5 | 3.800 | 0.555 | 1.00000 | 0.0 |
| L3 | 6 | −32.592 | 1.128 | 1.54390 | 56.0 |
|  | 7 | −1.277 | 0.271 | 1.00000 | 0.0 |
| L4 | 8 | 24.878 | 0.337 | 1.53460 | 56.2 |
|  | 9 | 2.199 | 0.327 | 1.00000 | 0.0 |
| L5 | 10 | ∞ | 0.260 | 1.57680 | 31.5 |
|  | 11 | 2.360 | 0.684 | 1.00000 | 0.0 |

In the imaging lens 2, among the ten lens surfaces (the 2nd surface to the 11th surface) of the first lens 21 to the fifth lens 25, each surface except the front surface of the fifth lens 25 (the 10th surface) is an aspheric surface.

The aspherical coefficient of the aspheric surface in the numerical embodiment 2 is shown together with the conic constant k in Table 7, Table 8, and Table 9.

TABLE 7

| Sn | K | A3 | A4 | A5 | A6 | A7 |
|---|---|---|---|---|---|---|
| 2 | −1.6909E−01 | 2.4582E−03 | −1.9902E−03 | 3.5655E−03 | −2.9114E−03 | −3.5539E−03 |
| 3 | 0.0000E+00 | 4.7045E−04 | −4.7866E−05 | −1.3673E−03 | −4.2272E−03 | −3.1861E−03 |
| 4 | 0.0000E+00 | 5.9142E−03 | −1.0984E−02 | −1.1380E−02 | 5.3527E−03 | 6.3483E−03 |
| 5 | 3.3270E−02 | 5.2157E−03 | 9.0751E−03 | 4.5951E−03 | 3.7812E−03 | 8.7836E−04 |
| 6 | 0.0000E+00 | −1.3461E−03 | 1.0079E−02 | −1.3413E−02 | −1.2548E−02 | 2.7495E−02 |
| 7 | −4.1840E+00 | −2.0723E−02 | −8.0097E−03 | −8.2608E−03 | −7.8440E−04 | 2.7268E−03 |
| 8 | 0.0000E+00 | −2.5126E−02 | 4.9559E−02 | −6.0616E−02 | −8.9624E−02 | 1.6237E−01 |
| 9 | −5.8712E+00 | 5.5964E−03 | −4.4560E−02 | −1.0753E−02 | 1.4661E−02 | −7.0281E−05 |
| 11 | −1.6426E+01 | 4.1850E−04 | −8.5726E−03 | −1.3588E−04 | 5.9024E−05 | 4.5820E−05 |

TABLE 8

| Sn | A8 | A9 | A10 | A11 | A12 | A13 |
|---|---|---|---|---|---|---|
| 2 | −1.5689E−03 | −2.8497E−04 | 5.0797E−04 | −1.7694E−03 | −2.2005E−03 | −1.4489E−03 |
| 3 | −2.3986E−03 | −7.4816E−04 | −1.8956E−03 | −7.8294E−04 | −8.0358E−04 | 5.4767E−04 |
| 4 | 2.3215E−03 | 9.3307E−04 | 7.1041E−04 | 5.5292E−04 | 2.0838E−05 | −4.7883E−04 |
| 5 | 1.0141E−03 | 1.0740E−03 | 1.9127E−03 | 1.2776E−03 | 1.3078E−03 | 6.7691E−04 |
| 6 | −6.3430E−03 | −6.8312E−03 | −6.2626E−04 | −2.7450E−04 | −2.0831E−04 | 7.4088E−04 |
| 7 | 1.7983E−03 | 2.0885E−04 | 1.1942E−04 | −5.3544E−06 | −1.5098E−04 | 1.7578E−05 |
| 8 | −1.5640E−01 | 9.6330E−02 | −2.0394E−02 | −1.1113E−03 | −1.0269E−02 | 6.7703E−03 |
| 9 | −1.6830E−03 | 3.7484E−05 | 2.9573E−04 | −9.0236E−05 | −2.0476E−05 | 2.2436E−06 |
| 11 | 1.1706E−05 | 1.1585E−06 | 5.7919E−08 | 5.7664E−08 | −5.3798E−08 | −8.4409E−10 |

TABLE 9

| Sn | A14 | A15 | A16 | A17 | A18 | A19 | A20 |
|---|---|---|---|---|---|---|---|
| 2 | −4.2926E−04 | −4.3161E−05 | 7.4864E−04 |  |  |  |  |
| 3 | −6.1838E−04 | −4.4931E−04 | −7.5199E−04 |  |  |  |  |
| 4 | 3.1267E−04 | −1.9151E−04 | 1.3373E−04 | −2.6115E−05 | −2.1483E−04 | −2.3542E−04 | −1.0728E−04 |
| 5 | 2.2680E−04 | 1.2835E−04 | 5.9109E−05 | 5.0274E−05 | −1.2512E−04 | −2.8640E−04 | −2.3064E−04 |
| 6 | 6.8243E−04 | 5.4046E−05 | −1.1874E−05 | 1.2161E−05 | −4.6237E−05 | −8.7838E−05 | 1.3910E−05 |
| 7 | 3.7472E−06 | −8.2175E−06 | −3.4846E−06 | −5.4879E−07 | 2.1217E−06 | 9.3529E−07 | 1.5030E−07 |
| 8 | 3.7073E−03 | −4.3302E−03 | 1.0537E−03 | −7.6074E−07 | 2.1807E−06 | −7.4429E−07 | −1.6898E−06 |

TABLE 9-continued

| Sn | A14 | A15 | A16 | A17 | A18 | A19 | A20 |
|---|---|---|---|---|---|---|---|
| 9 | −1.7081E−06 | 2.5324E−06 | −4.6543E−07 | 1.0967E−07 | −1.1638E−07 | 5.0613E−08 | −3.6105E−09 |
| 11 | −9.8245E−09 | 4.8365E−09 | −1.5859E−09 | −2.7325E−10 | −1.8294E−10 | −9.2526E−11 | −4.4117E−11 |

The system focal length, the F number, the total field of view, the maximum image height, the optical total length (TTL) of the imaging lens 2, the focal length f1234 of the composite optical system of the first lens 21 to the fourth lens 24, and the focal length f5 of the fifth lens 25, according to the numerical embodiment 2, are shown in Table 10.

TABLE 10

| f(mm) | 3.59 |
|---|---|
| F number | 2.25 |
| Total field of view (°) | 77.7 |
| Maximum image height (mm) | 2.946 |
| TTL (mm) | 4.690 |
| f1234(mm) | 3.07 |
| f5(mm) | −4.09 |

According to Table 10, since TTL/2ih=0.796 in the numerical embodiment 2, the above condition (1) is satisfied. Further, since ih/f=0.821 in the numerical embodiment 2 according to Table 10, the above condition (2) is satisfied. Further, since f/f1234=1.17 in the numerical embodiment 2 according to Table 10, the above condition (3) is satisfied. Further, since f/f5=−0.88 in the numerical embodiment 2 according to Table 10, the above condition (4) is satisfied.

Figure 4:
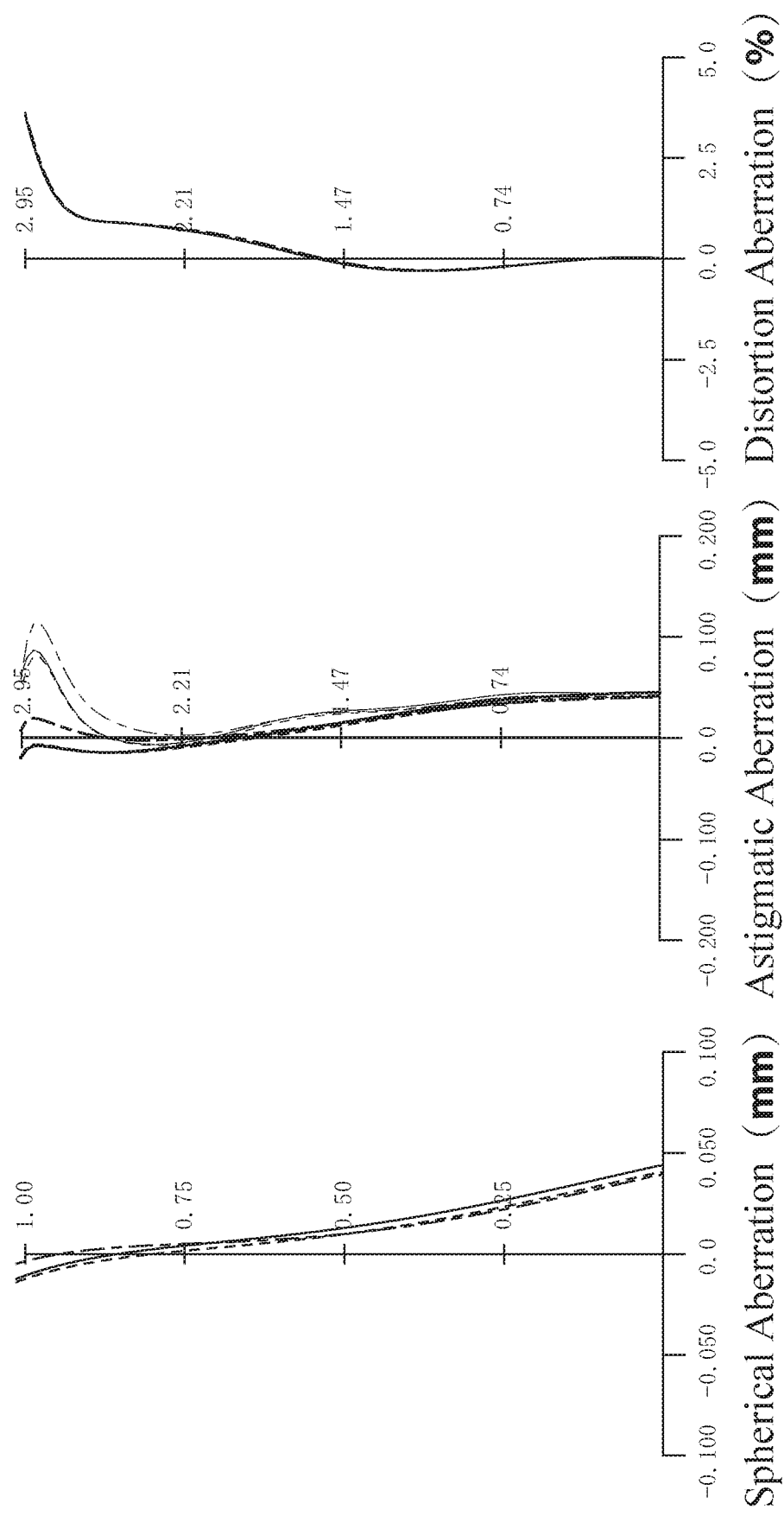
FIG. 4 shows various kinds of aberration diagrams in an infinity in-focus state of a numerical embodiment 2.

FIG. 4 shows various kinds of aberration diagrams in an infinity in-focus state of the numerical embodiment 2.

In FIG. 4, a spherical aberration diagram, an astigmatic aberration diagram, and a distortion aberration diagram are shown.

In the spherical aberration diagram, the astigmatic aberration diagram, and the distortion aberration diagram, the value on the line d (wavelength 587.6 nm) is shown by a dashed line, the value on the line g (wavelength 435.8 nm) is shown by a chain line, the value on the line C (wavelength 656.3 nm) is shown by a solid line. Further, in the astigmatic aberration diagram, the value on the sagittal image plane is shown by a thick line, and the value on the tangential image plane is shown by a thin line.

Further, in the distortion aberration diagram, the lines of the line d, the line g, and the line C are substantially coincident.

It can be inferred from the aberration diagrams that various kinds of aberrations in the numerical embodiment 2 are all well corrected, and excellent imaging performance is obtained.

The Third Embodiment

Figure 5:
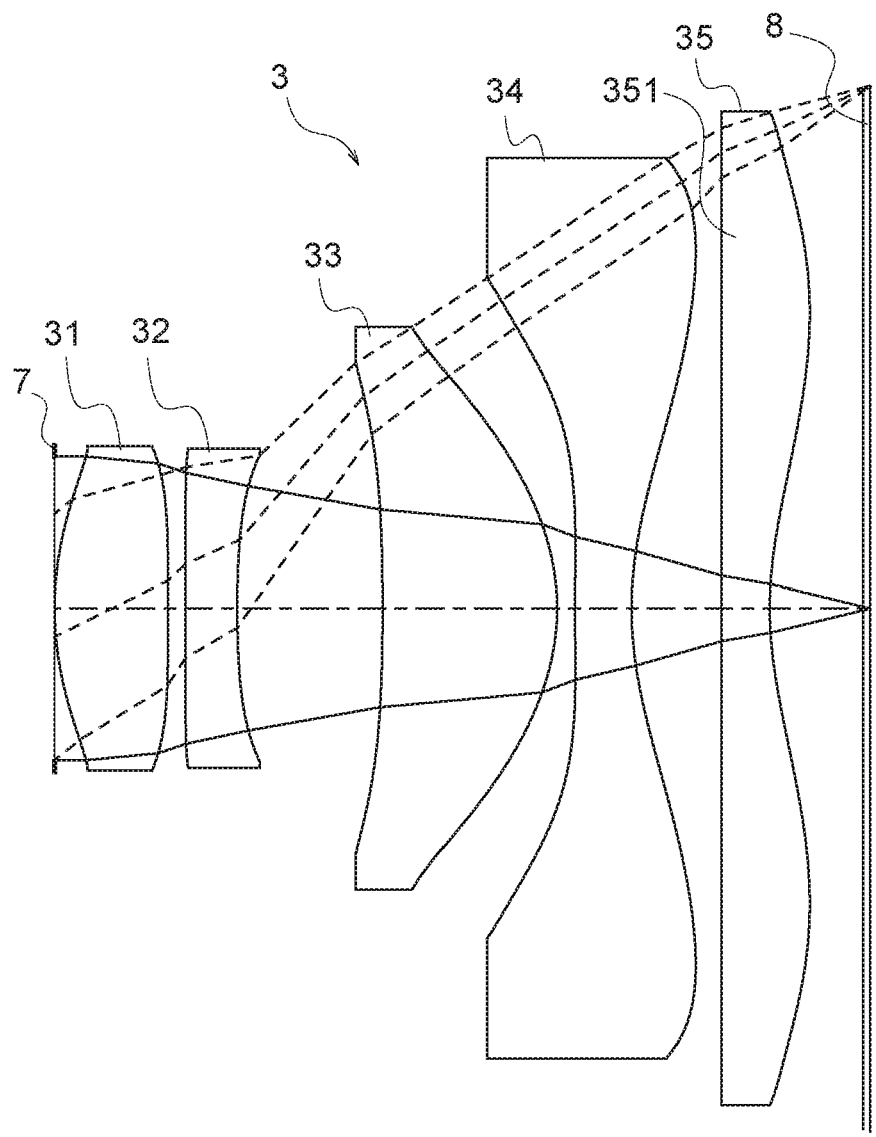
FIG. 5 shows a lens configuration of an imaging lens in a third embodiment.

FIG. 5 shows the lens configuration of an imaging lens 3 in the third embodiment.

The imaging lens 3 of the third embodiment includes, in order from the object side to the image side, a first lens 31 having a positive refractive power, a second lens 32 having a negative refractive power, a third lens 33 having a positive refractive power, a fourth lens 34 having a negative refractive power at the center of the lens and having an inflection point at a position away from the optical axis, and a fifth lens 35 having a negative refractive power at the center of the lens and having an inflection point at a position away from the optical axis.

An aperture 7 with a fixed opening is provided on the object side of the first lens 31. The imaging surface of the imaging lens 3 is provided with an imaging element (image sensor) 8.

The fifth lens 35 in the third embodiment is a lens made of ultraviolet curable resin, and the front surface of the fifth lens 35 is a plane. The ultraviolet curable resin used in the fifth lens 35 of the third embodiment is different from the ultraviolet curable resin used in the fifth lens 25 of the second embodiment. Further, an infrared cut layer 351 with pigment is formed on the front surface of the fifth lens 35 by spin coating.

The lens data of the numerical embodiment 3 obtained by applying specific numerical values to the imaging lens 3 of the third embodiment is shown in Table 11.

TABLE 11

| Optical element | S n | R(mm) | D(mm) | nd | vd |
|---|---|---|---|---|---|
| Aperture | 1 | ∞ | 0.000 | 1.00000 | 0.0 |
| L1 | 2 | 1.828 | 0.640 | 1.54390 | 56.0 |
|  | 3 | −54.691 | 0.099 | 1.00000 | 0.0 |
| L2 | 4 | −35.277 | 0.292 | 1.66130 | 20.4 |
|  | 5 | 6.949 | 0.819 | 1.00000 | 0.0 |
| L3 | 6 | −18.634 | 0.982 | 1.54390 | 56.0 |
|  | 7 | −1.331 | 0.101 | 1.00000 | 0.0 |
| L4 | 8 | 13.093 | 0.319 | 1.53460 | 56.2 |
|  | 9 | 2.105 | 0.509 | 1.00000 | 0.0 |
| L5 | 10 | ∞ | 0.270 | 1.60176 | 30.8 |
|  | 11 | 2.069 | 0.527 | 1.00000 | 0.0 |

In the imaging lens 3, among the ten lens surfaces (the 2nd surface to the 11th surface) of the first lens 31 to the fifth lens 35, each surface except the front surface of the fifth lens 35 (the 10th surface) is an aspheric surface.

The aspherical coefficient of the aspheric surface in the numerical embodiment 3 is shown together with the conic constant k in Table 12, Table 13, and Table 14.

TABLE 12

| Sn | K | A3 | A4 | A5 | A6 | A7 |
|---|---|---|---|---|---|---|
| 2 | −3.2350E−01 | −3.6517E−03 | −1.7060E−02 | −1.7544E−03 | −1.5491E−02 | −1.4575E−02 |
| 3 | 0.0000E+00 | 3.4959E−03 | −7.1909E−02 | −3.2646E−02 | −3.5137E−02 | −1.0286E−02 |
| 4 | 0.0000E+00 | 9.1319E−03 | 1.6249E−02 | 1.3456E−02 | 1.3373E−03 | −2.2015E−02 |
| 5 | −7.4767E−02 | 1.0160E−02 | 8.4412E−02 | 4.8676E−02 | 2.8424E−03 | −2.0660E−02 |
| 6 | 0.0000E+00 | −1.6879E−02 | −2.1114E−02 | −2.2275E−03 | 1.6175E−03 | 1.6132E−03 |
| 7 | −2.8881E+00 | −4.5392E−02 | −1.0048E−02 | −5.9563E−03 | −5.0175E−04 | 3.6464E−03 |

TABLE 12-continued

| Sn | K | A3 | A4 | A5 | A6 | A7 |
|---|---|---|---|---|---|---|
| 8 | 0.0000E+00 | −4.5994E−02 | −6.3021E−02 | −1.2166E−03 | 1.2461E−02 | −7.9719E−03 |
| 9 | −4.3332E+00 | 1.3829E−02 | −3.7790E−02 | 8.3066E−04 | 2.6434E−03 | 7.7108E−04 |
| 11 | −8.3376E+00 | −1.5260E−02 | −1.7808E−02 | 2.6282E−03 | 7.1056E−05 | 2.2719E−04 |

TABLE 13

| Sn | A8 | A9 | A10 | A11 | A12 | A13 |
|---|---|---|---|---|---|---|
| 2 | 1.9754E−03 | −1.4028E−02 | −2.1457E−02 | −3.7177E−03 | −2.8293E−03 | 4.6498E−03 |
| 3 | 2.6137E−02 | 1.1472E−02 | −9.0119E−03 | −5.3777E−03 | −5.9039E−03 | −1.9201E−02 |
| 4 | −9.9831E−03 | 7.4084E−03 | 7.8781E−03 | 7.8579E−03 | 1.0108E−02 | 1.2522E−02 |
| 5 | −4.6266E−03 | 4.5227E−03 | 4.6719E−03 | 1.6253E−03 | −2.2937E−03 | 4.1651E−03 |
| 6 | −1.7685E−03 | 2.4002E−03 | −5.2074E−04 | −1.9984E−04 | −6.9680E−05 | 8.5472E−05 |
| 7 | −6.3119E−04 | −4.5998E−04 | 2.3298E−04 | 1.4730E−04 | 2.1656E−04 | 1.0043E−04 |
| 8 | 2.8232E−03 | 1.1701E−03 | 9.1213E−04 | −8.3831E−04 | 1.6082E−06 | 1.3917E−04 |
| 9 | 1.4175E−04 | −1.4231E−04 | −3.5428E−05 | −1.7790E−05 | 8.1171E−06 | 1.5030E−06 |
| 11 | −6.8108E−05 | −3.2351E−06 | −3.4162E−06 | 1.0263E−06 | −2.8344E−07 | 5.0770E−07 |

TABLE 14

| Sn | A14 | A15 | A16 | A17 | A18 | A19 | A20 |
|---|---|---|---|---|---|---|---|
| 2 | 1.8758E−04 | −3.4033E−03 | −6.1213E−04 | −8.4593E−03 | 4.7718E−03 | −3.1031E−03 | 1.1754E−02 |
| 3 | −1.8349E−03 | 4.3194E−03 | 2.2911E−02 | 1.8826E−02 | 1.6076E−02 | −2.1960E−03 | −3.6342E−02 |
| 4 | 3.5196E−03 | 4.9420E−03 | −3.7654E−03 | 1.1973E−03 | −7.0176E−03 | −7.7241E−03 | 2.2587E−03 |
| 5 | 1.3227E−03 | −5.6559E−04 | 5.4208E−03 | 5.9890E−03 | 3.1307E−03 | −2.8299E−03 | −1.0096E−02 |
| 6 | 1.2172E−04 | −5.9006E−05 | −2.5193E−05 | −7.6140E−06 | 7.9453E−06 | 1.3656E−05 | −3.2350E−06 |
| 7 | 7.2934E−07 | 1.6861E−05 | −1.0007E−05 | −5.8601E−06 | −3.0310E−06 | 1.7539E−07 | −1.1121E−06 |
| 8 | −1.6581E−05 | −2.8479E−05 | 1.4669E−05 | −1.1209E−05 | 5.6089E−07 | 3.1847E−06 | −8.7551E−07 |
| 9 | −8.0596E−08 | −1.8485E−07 | −1.3518E−09 | −3.0976E−09 | −4.7272E−10 | −1.4167E−09 | 8.2341E−10 |
| 11 | 5.4455E−08 | 2.4600E−09 | −3.0817E−09 | −3.1073E−09 | −2.6231E−10 | −1.5014E−10 | −7.1136E−11 |

The system focal length, the F number, the total field of view, the maximum image height, the optical total length (TTL) of the imaging lens 3, the focal length f1234 of the composite optical system of the first lens 31 to the fourth lens 34, and the focal length f5 of the fifth lens 35, according to the numerical embodiment 3, are shown in Table 15.

TABLE 15

| | |
|---|---|
| f(mm) | 3.56 |
| F number | 2.13 |
| Total field of view (°) | 78.2 |
| Maximum image height (mm) | 2.946 |
| TTL (mm) | 4.598 |
| f1234(mm) | 3.09 |
| f5(mm) | −3.44 |

According to Table 15, since TTL/2ih=0.780 in the numerical embodiment 3, the above condition (1) is satisfied. Further, since ih/f=0.827 in the numerical embodiment 3 according to Table 15, the above condition (2) is satisfied. Further, since f/f1234=1.15 in the numerical embodiment 3 according to Table 15, the above condition (3) is satisfied. Further, since f/f5=−1.04 in the numerical embodiment 3 according to Table 15, the above condition (4) is satisfied.

Figure 6:
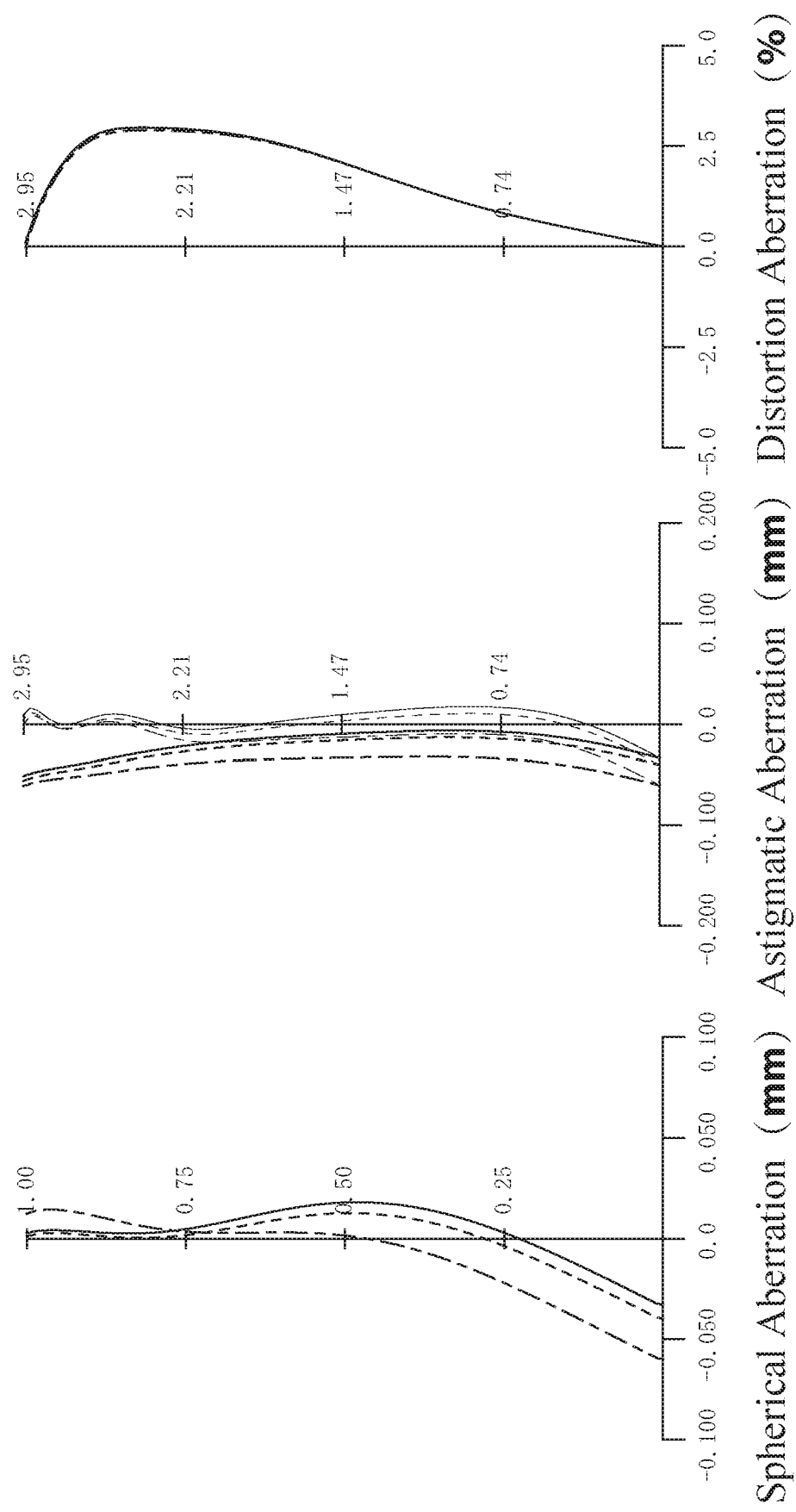
FIG. 6 shows various kinds of aberration diagrams in an infinity in-focus state of a numerical embodiment 3.

FIG. 6 shows various kinds of aberration diagrams in an infinity in-focus state of the numerical embodiment 3.

In FIG. 6, a spherical aberration diagram, an astigmatic aberration diagram, and a distortion aberration diagram are shown.

In the spherical aberration diagram, the astigmatic aberration diagram, and the distortion aberration diagram, the value on the line d (wavelength 587.6 nm) is shown by a dashed line, the value on the line g (wavelength 435.8 nm) is shown by a chain line, the value on the line C (wavelength 656.3 nm) is shown by a solid line. Further, in the astigmatic aberration diagram, the value on the sagittal image plane is shown by a thick line, and the value on the tangential image plane is shown by a thin line.

Further, in the distortion aberration diagram, the lines of the line d, the line g, and the line C are substantially coincident.

It can be inferred from the aberration diagrams that various kinds of the aberrations in the numerical embodiment 3 are all well corrected, and excellent imaging performance is obtained.

The Fourth Embodiment

Figure 7:
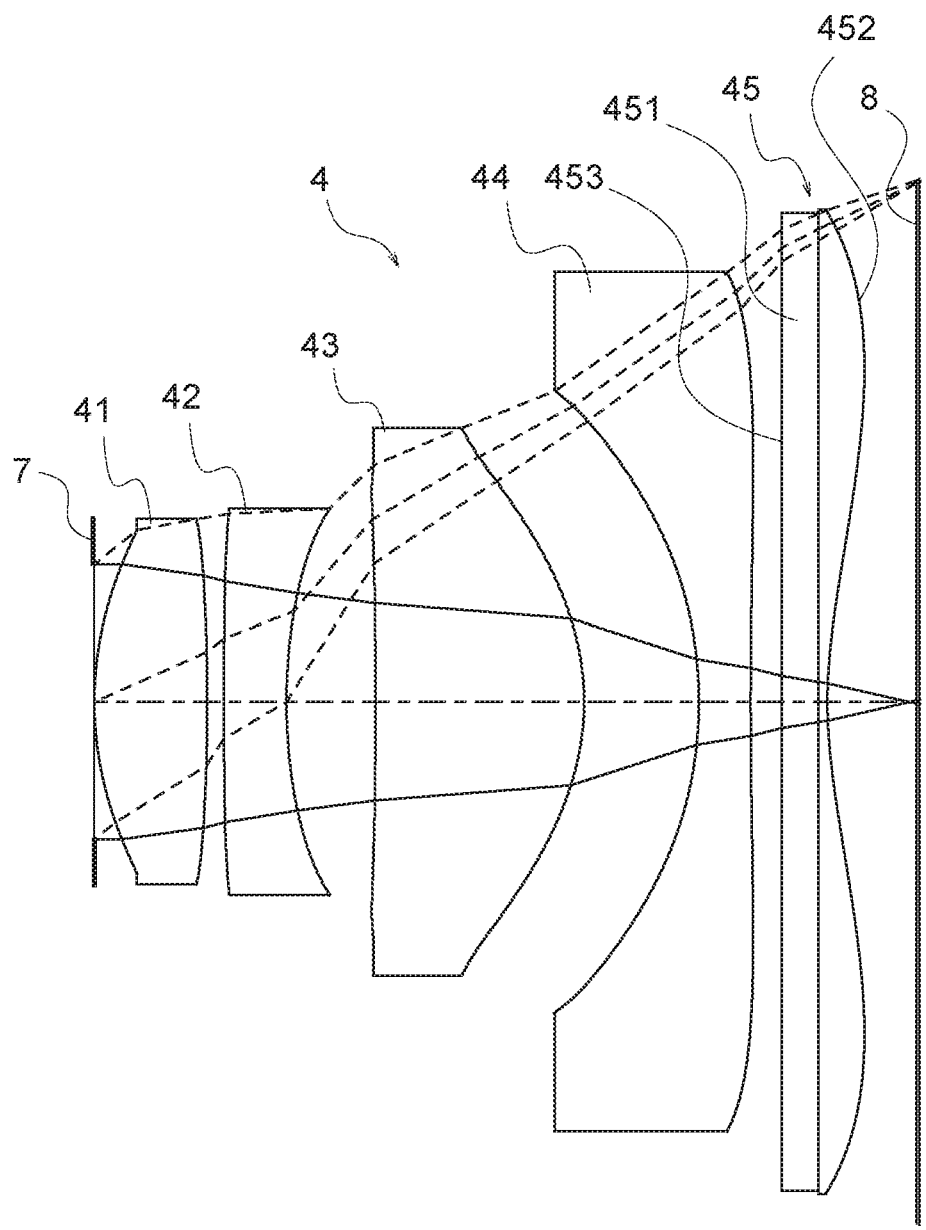
FIG. 7 shows a lens configuration of an imaging lens in a fourth embodiment.

FIG. 7 shows the lens configuration of an imaging lens 4 in the fourth embodiment.

The imaging lens 4 of the fourth embodiment includes, in order from the object side to the image side, a first lens 41 having a positive refractive power, a second lens 42 having a negative refractive power, a third lens 43 having a positive refractive power, a fourth lens 44 having a negative refractive power at the center of the lens and having an inflection point at a position away from the optical axis, and a fifth lens 45 having a negative refractive power at the center of the lens and having an inflection point at a position away from the optical axis.

An aperture 7 with a fixed opening is provided on the object side of the first lens 41. The imaging surface of the imaging lens 4 is provided with an imaging element (image sensor) 8.

The fifth lens 45 in the fourth embodiment is a composite lens composed of a glass substrate 451 made of blue glass and a lens portion 452 of ultraviolet curable resin. Further, an infrared cut film 453 is formed on the front surface of the glass substrate 451 by vacuum evaporation.

The lens data of the numerical embodiment 4 obtained by applying specific numerical values to the imaging lens 4 of the fourth embodiment is shown in Table 16.

TABLE 16

| Optical element | S n | R(mm) | D(mm) | nd | vd |
|---|---|---|---|---|---|
| Aperture | 1 | ∞ | 0.000 | 1.00000 | 0.0 |
| L1 | 2 | 1.972 | 0.640 | 1.54390 | 56.0 |
|  | 3 | −10.236 | 0.094 | 1.00000 | 0.0 |
| L2 | 4 | 48.309 | 0.356 | 1.66130 | 20.4 |
|  | 5 | 3.261 | 0.503 | 1.00000 | 0.0 |
| L3 | 6 | 4876.150 | 1.182 | 1.54390 | 56.0 |
|  | 7 | −1.459 | 0.650 | 1.00000 | 0.0 |

TABLE 16-continued

| Optical element | S n | R(mm) | D(mm) | nd | vd |
|---|---|---|---|---|---|
| L4 | 8 | −2.423 | 0.295 | 1.53460 | 56.2 |
|  | 9 | 36.187 | 0.175 | 1.00000 | 0.0 |
| L5(Substrate) | 10 | ∞ | 0.210 | 1.51680 | 64.2 |
| L5(Lens) | 11 | ∞ | 0.050 | 1.57683 | 31.5 |
|  | 12 | 2.664 | 0.504 | 1.00000 | 0.0 |

In the imaging lens 4, among the eleven lens surfaces (the 2nd surface to the 12th surface) of the first lens 41 to the lens portion 452 of the fifth lens 45, each surface except the two surfaces of the glass substrate 451 (the 10th surface and the 11th surface) is an aspheric surface.

The aspherical coefficient of the aspheric surface in the numerical embodiment 4 is shown together with the conic constant k in Table 17, Table 18, and Table 19.

TABLE 17

| Sn | K | A3 | A4 | A5 | A6 | A7 |
|---|---|---|---|---|---|---|
| 2 | −5.6361E−01 | 2.3954E−03 | −5.2510E−04 | −2.4023E−04 | −5.5257E−04 | −1.4995E−03 |
| 3 | 0.0000E+00 | 6.9309E−03 | 3.0342E−03 | 3.4766E−04 | −2.7450E−03 | −4.7511E−03 |
| 4 | 0.0000E+00 | 2.2531E−03 | 5.1392E−03 | 3.4065E−04 | 8.8919E−04 | 4.7536E−04 |
| 5 | 3.9322E+00 | 5.7390E−03 | −1.4558E−03 | 1.8646E−03 | 2.6521E−03 | 2.6167E−03 |
| 6 | 0.0000E+00 | −1.1438E−02 | −5.9687E−03 | 2.1925E−04 | 4.4166E−04 | 9.4471E−05 |
| 7 | −1.9727E+00 | −1.0024E−02 | −6.6979E−04 | −5.8563E−03 | −6.3919E−03 | 8.8049E−04 |
| 8 | 4.6004E−01 | −1.3471E−02 | −7.0248E−03 | 7.5801E−03 | −1.5284E−03 | 2.1891E−03 |
| 9 | 0.0000E+00 | 1.1041E−03 | −4.3891E−03 | 1.0513E−04 | 8.5863E−06 | −3.5828E−05 |
| 12 | −2.0063E+01 | −3.2835E−03 | −5.7480E−03 | −2.9746E−04 | −2.8220E−05 | 2.0292E−06 |

TABLE 18

| Sn | A8 | A9 | A10 | A11 | A12 | A13 |
|---|---|---|---|---|---|---|
| 2 | −3.5637E−03 | −2.2939E−04 | −1.2138E−04 | −2.6549E−04 | −2.1294E−04 | −3.7734E−04 |
| 3 | −4.8640E−03 | −6.9761E−04 | −1.3785E−03 | −7.0790E−04 | −5.0961E−04 | −4.7471E−04 |
| 4 | 2.2024E−03 | −2.3264E−05 | −2.7967E−05 | 3.0293E−04 | 3.9162E−05 | 2.9026E−04 |
| 5 | 1.4918E−03 | 3.6344E−04 | 2.5515E−04 | 3.9184E−04 | 2.3432E−04 | 3.5254E−04 |
| 6 | 6.6584E−04 | 3.7933E−04 | 3.5651E−04 | 1.6283E−04 | 1.1838E−04 | 9.5564E−05 |
| 7 | 3.9290E−03 | 6.5589E−05 | −2.7944E−05 | 1.8714E−05 | 1.8117E−05 | 1.9816E−05 |
| 8 | −2.2585E−05 | 2.4121E−04 | 3.4786E−05 | 3.1051E−05 | −5.2244E−08 | −1.3886E−06 |
| 9 | −2.4473E−05 | −1.7079E−06 | −1.0215E−06 | −3.3877E−07 | −4.3060E−08 | 2.0213E−08 |
| 12 | −9.4159E−06 | −5.4561E−07 | −1.9525E−09 | 3.8602E−08 | 3.2395E−09 | −3.8448E−09 |

TABLE 19

| Sn | A14 | A15 | A16 | A17 | A18 | A19 | A20 |
|---|---|---|---|---|---|---|---|
| 2 | −2.6465E−04 | −3.5325E−04 | −4.6309E−04 |  |  |  |  |
| 3 | 6.0135E−05 | 2.6324E−05 | 3.0545E−05 |  |  |  |  |
| 4 | 1.2885E−04 | 1.1526E−04 | 1.0394E−04 | −4.9266E−05 | −2.1493E−05 | −8.9615E−05 | −7.3907E−05 |
| 5 | 8.3784E−05 | 1.8056E−05 | 1.3047E−04 | 4.0473E−05 | −6.1049E−05 | −1.1803E−05 | −8.7969E−05 |
| 6 | 5.1417E−06 | 1.8159E−05 | −2.1763E−06 | −6.0243E−06 | 5.9617E−06 | 2.3446E−06 | −3.1935E−06 |
| 7 | 2.8866E−06 | 2.1964E−06 | 2.1589E−06 | 4.1671E−07 | 1.6163E−07 | −1.6039E−07 | −4.8219E−07 |
| 8 | 3.5207E−06 | −4.0039E−06 | −9.6765E−07 | −2.4417E−07 | −5.8112E−07 | −1.6699E−07 | −1.7213E−07 |
| 9 | −3.4473E−08 | −6.7617E−09 | 7.9905E−09 | −2.3607E−09 | −3.6936E−10 | −3.3441E−10 | −5.8511E−11 |
| 12 | −1.7079E−09 | 1.0333E−10 | −1.1394E−10 | −1.5242E−11 | −1.8945E−11 | 3.8149E−12 | −1.3666E−12 |

The system focal length, the F number, the total field of view, the maximum image height, the optical total length (TTL) of the imaging lens 4, the focal length f1234 of the composite optical system of the first lens 41 to the fourth lens 44, and the focal length f5 of the fifth lens 45, according to the numerical embodiment 4, are shown in Table 20.

TABLE 20

| | |
|---|---|
| f(mm) | 3.55 |
| F number | 2.25 |
| Total field of view (°) | 77.5 |
| Maximum image height (mm) | 2.946 |
| TTL (mm) | 4.677 |
| f1234(mm) | 3.20 |
| f5(mm) | -4.62 |

According to Table 20, since TTL/2ih=0.794 in the numerical embodiment 4, the above condition (1) is satisfied. Further, since ih/f=0.831 in the numerical embodiment 4 according to Table 20, the above condition (2) is satisfied. Further, since f/f1234=1.11 in the numerical embodiment 4 according to Table 20, the above condition (3) is satisfied. Further, since f/f5=-0.77 in the numerical embodiment 4 according to Table 20, the above condition (4) is satisfied.

Figure 8:
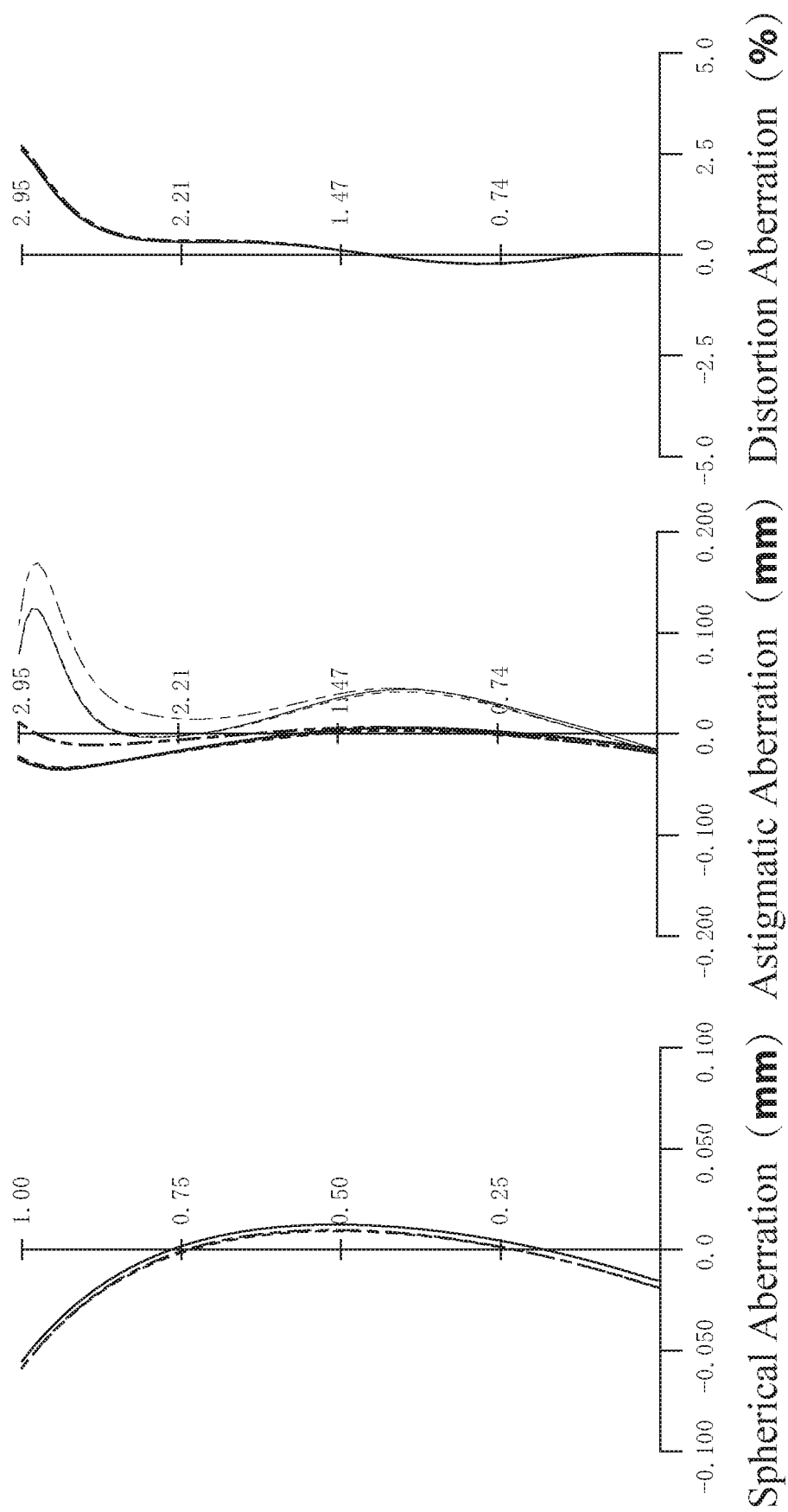
FIG. 8 shows various kinds of aberration diagrams in an infinity in-focus state of a numerical embodiment 4.

FIG. 8 shows various kinds of aberration diagrams in an infinity in-focus state of the numerical embodiment 4.

In FIG. 8, a spherical aberration diagram, an astigmatic aberration diagram, and a distortion aberration diagram are shown.

In the spherical aberration diagram, the astigmatic aberration diagram, and the distortion aberration diagram, the value on the line d (wavelength 587.6 nm) is shown by a dashed line, the value on the line g (wavelength 435.8 nm) is shown by a chain line, the value on the line C (wavelength 656.3 nm) is shown by a solid line. Further, in the astigmatic aberration diagram, the value on the sagittal image plane is shown by a thick line, and the value on the tangential image plane is shown by a thin line.

Further, in the distortion aberration diagram, the lines of the line d, the line g, and the line C are substantially coincident.

It can be inferred from the aberration diagrams that various kinds of the aberrations in the numerical embodiment 4 are all well corrected, and excellent imaging performance is obtained.

The Fifth Embodiment

Figure 9:
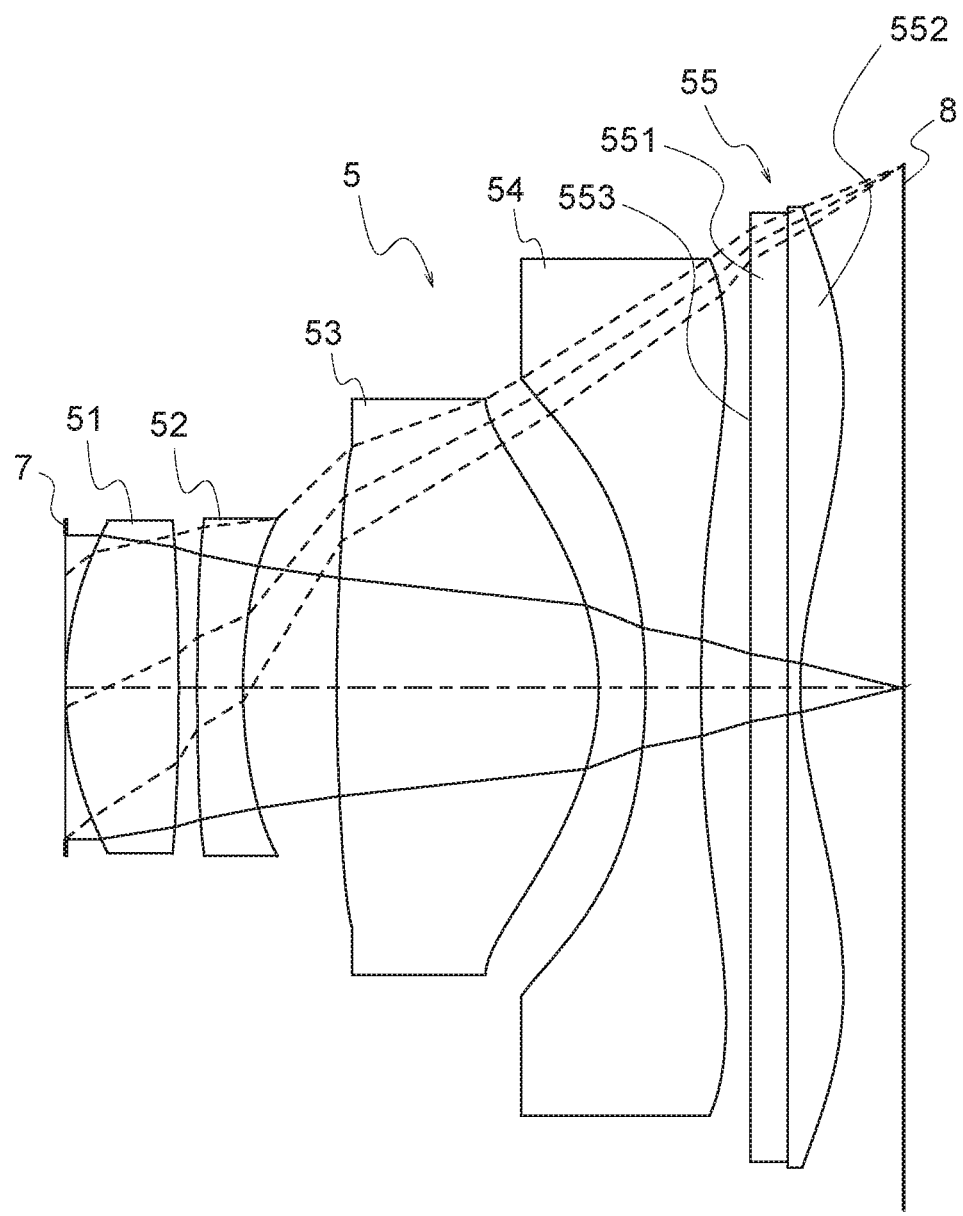
FIG. 9 shows a lens configuration of an imaging lens in a fifth embodiment.

FIG. 9 shows the lens configuration of an imaging lens 5 in the fifth embodiment.

The imaging lens 5 of the fifth embodiment includes, in order from the object side to the image side, a first lens 51 having a positive refractive power, a second lens 52 having a negative refractive power, a third lens 53 having a positive refractive power, a fourth lens 54 having a negative refractive power at the center of the lens and having an inflection point at a position away from the optical axis, and a fifth lens 55 having a negative refractive power at the center of the lens and having an inflection point at a position away from the optical axis.

An aperture 7 with a fixed opening is provided on the object side of the first lens 51. The imaging surface of the imaging lens 5 is provided with an imaging element (image sensor) 8.

The fifth lens 55 in the fifth embodiment is a composite lens composed of a glass substrate 551 made of blue glass and a lens portion 552 of ultraviolet curable resin. The ultraviolet curable resin used in the lens portion 552 of the fifth embodiment is different from the ultraviolet curable resin used in the lens portion 452 of the fourth embodiment. An infrared cut film 553 is formed on the front surface of the glass substrate 551 by vacuum evaporation.

The lens data of the numerical embodiment 5 obtained by applying specific numerical values to the imaging lens 5 of the fifth embodiment is shown in Table 21.

TABLE 21

| Optical element | S n | R(mm) | D(mm) | nd | vd |
|---|---|---|---|---|---|
| Aperture | 1 | ∞ | 0.000 | 1.00000 | 0.0 |
| L1 | 2 | 1.858 | 0.640 | 1.54390 | 56.0 |
| | 3 | -12.363 | 0.105 | 1.00000 | 0.0 |
| L2 | 4 | 23.069 | 0.259 | 1.66130 | 20.4 |
| | 5 | 2.931 | 0.529 | 1.00000 | 0.0 |
| L3 | 6 | 10.951 | 1.476 | 1.54390 | 56.0 |
| | 7 | -1.408 | 0.265 | 1.00000 | 0.0 |
| L4 | 8 | -3.304 | 0.315 | 1.53460 | 56.2 |
| | 9 | 27.197 | 0.279 | 1.00000 | 0.0 |
| L5(Substrate) | 10 | ∞ | 0.210 | 1.51680 | 64.2 |
| L5(Lens) | 11 | ∞ | 0.070 | 1.60176 | 30.8 |
| | 12 | 1.772 | 0.580 | 1.00000 | 0.0 |

In the imaging lens 5, among the eleven lens surfaces (the 2nd surface to the 12th surface) of the first lens 51 to the lens portion 552 of the fifth lens 55, each surface except the two surfaces of the glass substrate 551 (the 10th surface and the 11th surface) is an aspheric surface.

The aspherical coefficient of the aspheric surface in the numerical embodiment 5 is shown together with the conic constant k in Table 22, Table 23, and Table 24.

TABLE 22

| Sn | K | A3 | A4 | A5 | A6 | A7 |
|---|---|---|---|---|---|---|
| 2 | -1.0352E+00 | 1.2555E-03 | 9.1253E-03 | 5.4693E-03 | 1.4397E-03 | -4.6586E-03 |
| 3 | 0.0000E+00 | 9.8404E-03 | 1.6115E-03 | -2.2877E-03 | -6.0533E-03 | -1.9543E-03 |
| 4 | 0.0000E+00 | 1.0025E-02 | 5.2423E-03 | -7.5618E-03 | 4.6171E-03 | 1.1003E-02 |
| 5 | 1.2138E+00 | 6.4116E-03 | 7.7928E-03 | 5.9899E-03 | 7.2929E-03 | 3.6364E-03 |
| 6 | 0.0000E+00 | -3.3159E-03 | -5.9908E-03 | -2.0547E-03 | 2.9918E-03 | -4.1962E-05 |
| 7 | -2.9056E+00 | -1.1513E-02 | -1.2029E-03 | -1.0630E-02 | -4.9489E-03 | 7.0667E-03 |
| 8 | 0.0000E+00 | 4.4059E-03 | -1.8419E-02 | -1.2815E-02 | -2.7765E-03 | 3.0009E-03 |
| 9 | -1.8999E+01 | 5.9383E-02 | -1.2483E-02 | -8.0904E-03 | -2.1494E-03 | 1.7722E-03 |
| 12 | -7.1401E4+00 | -4.0124E-02 | -7.0125E-03 | 5.3673E-03 | 6.7972E-04 | -1.9758E-03 |

TABLE 23

| Sn | A8 | A9 | A10 | A11 | A12 | A13 |
|---|---|---|---|---|---|---|
| 2 | −6.4891E−03 | −2.9798E−04 | −1.6883E−04 | −1.9191E−04 | 8.5222E−05 | −7.3846E−04 |
| 3 | −6.1871E−04 | −1.6730E−04 | −1.8798E−04 | −3.6620E−04 | −3.0214E−04 | −1.5132E−04 |
| 4 | 3.0957E−03 | −1.5083E−05 | −1.1172E−04 | 1.3126E−04 | 6.7497E−06 | −4.6403E−05 |
| 5 | 6.8461E−03 | 1.1708E−04 | 3.8267E−04 | 2.9492E−04 | 3.8121E−04 | 4.1957E−04 |
| 6 | 1.0106E−03 | 1.2229E−04 | 6.9102E−05 | 5.5086E−05 | 3.7232E−05 | 2.1207E−05 |
| 7 | 5.0867E−04 | 5.5490E−05 | 3.2128E−05 | 1.9538E−05 | 1.4351E−05 | 9.1808E−06 |
| 8 | −7.2185E−05 | 1.7910E−04 | 8.3104E−05 | 2.7672E−05 | 9.4750E−06 | 5.3922E−06 |
| 9 | −1.7470E−04 | 8.5927E−06 | 2.0063E−06 | −1.2200E−07 | −1.6869E−07 | −8.4002E−08 |
| 12 | 4.6968E−04 | 2.7256E−06 | 1.0497E−06 | 4.2839E−07 | 5.4230E−08 | 1.8862E−08 |

TABLE 24

| Sn | A14 | A15 | A16 | A17 | A18 | A19 | A20 |
|---|---|---|---|---|---|---|---|
| 2 | −7.0570E−04 | −5.7678E−04 | −4.2859E−04 | −2.6289E−04 | −1.0202E−04 | 4.3113E−05 | 1.0386E−04 |
| 3 | 1.0895E−04 | −1.8852E−04 | −9.6715E−05 | −1.1108E−04 | −2.3955E−04 | −2.9323E−04 | −3.6061E−04 |
| 4 | −6.8858E−05 | 4.2163E−04 | 5.8052E−05 | −7.2470E−05 | 3.3041E−04 | 1.2462E−04 | 2.6430E−04 |
| 5 | 3.3355E−05 | 3.6490E−04 | 2.8199E−04 | 7.7989E−05 | −1.6247E−05 | −6.6759E−05 | −2.4912E−04 |
| 6 | 1.2190E−05 | 8.6332E−06 | 4.9223E−06 | 3.0357E−06 | −5.2475E−08 | −2.2971E−07 | −1.4391E−06 |
| 7 | 4.8947E−06 | 2.4366E−06 | 1.4347E−06 | 8.4321E−07 | 4.6426E−07 | 2.5079E−07 | 1.2990E−07 |
| 8 | 1.2494E−06 | 8.7008E−07 | −1.9483E−08 | 1.2161E−08 | −6.4807E−08 | −1.5336E−08 | 5.1279E−08 |
| 9 | −4.0785E−08 | −1.1580E−08 | −6.3157E−09 | −1.7613E−09 | −7.4214E−10 | −2.4992E−10 | −9.2374E−11 |
| 12 | −9.6992E−10 | −9.7301E−10 | −8.5302E−10 | −3.3559E−10 | −1.1315E−10 | −4.0619E−11 | −1.1259E−11 |

The system focal length, the F number, the total field of view, the maximum image height, the optical total length (TTL) of the imaging lens 5, the focal length f1234 of the composite optical system of the first lens 51 to the fourth lens 54, and the focal length f5 of the fifth lens 55, according to the numerical embodiment 5 are shown in Table 25.

TABLE 25

| | |
|---|---|
| f(mm) | 3.59 |
| F number | 2.11 |
| Total field of view (°) | 77.5 |
| Maximum image height (mm) | 2.946 |
| TTL (mm) | 4.736 |
| f1234(mm) | 3.00 |
| f5(mm) | −2.94 |

According to Table 25, since TTL/2ih=0.804 in the numerical embodiment 5, the above condition (1) is satisfied. Further, since ih/f=0.821 in the numerical embodiment 5 according to Table 25, the above condition (2) is satisfied. Further, since f/f1234=1.20 in the numerical embodiment 5 according to Table 25, the above condition (3) is satisfied. Further, since f/f5=−1.22 in the numerical embodiment 5 according to Table 25, the above condition (4) is satisfied.

Figure 10:
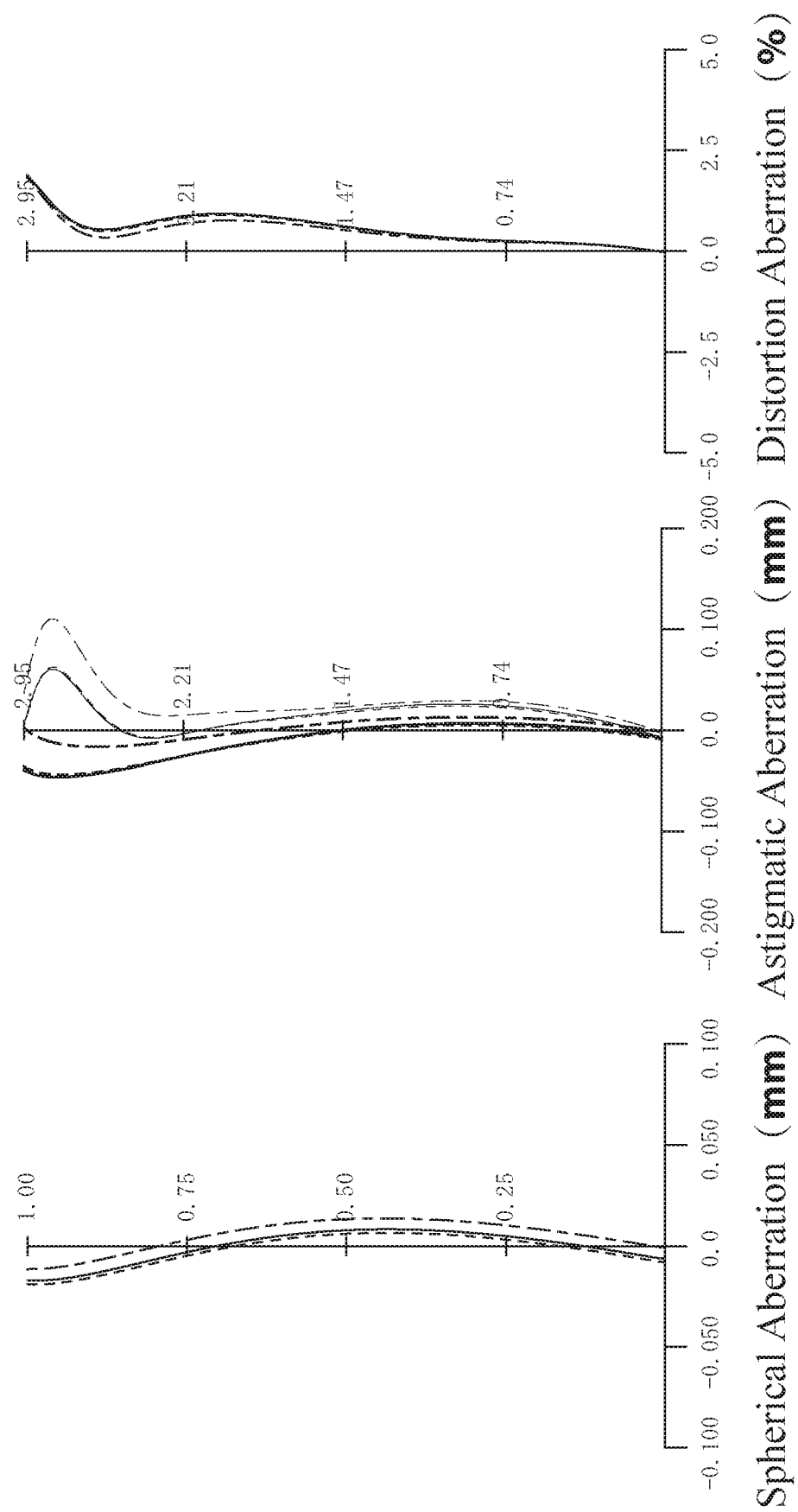
FIG. 10 shows various kinds of aberration diagrams in an infinity in-focus state of a numerical embodiment 5.

FIG. 10 shows various kinds of aberration diagrams in an infinity in-focus state of the numerical embodiment 5.

In FIG. 10, a spherical aberration diagram, an astigmatic aberration diagram, and a distortion aberration diagram are shown.

In the spherical aberration diagram, the astigmatic aberration diagram, and the distortion aberration diagram, the value on the line d (wavelength 587.6 nm) is shown by a dashed line, the value on the line g (wavelength 435.8 nm) is shown by a chain line, the value on the line C (wavelength 656.3 nm) is shown by a solid line. Further, in the astigmatic aberration diagram, the value on the sagittal image plane is shown by a thick line, and the value on the tangential image plane is shown by a thin line.

It can be inferred from the aberration diagrams that various kinds of the aberrations in the numerical embodiment 5 are all well corrected, and excellent imaging performance is obtained.

The Sixth Embodiment

Figure 11:
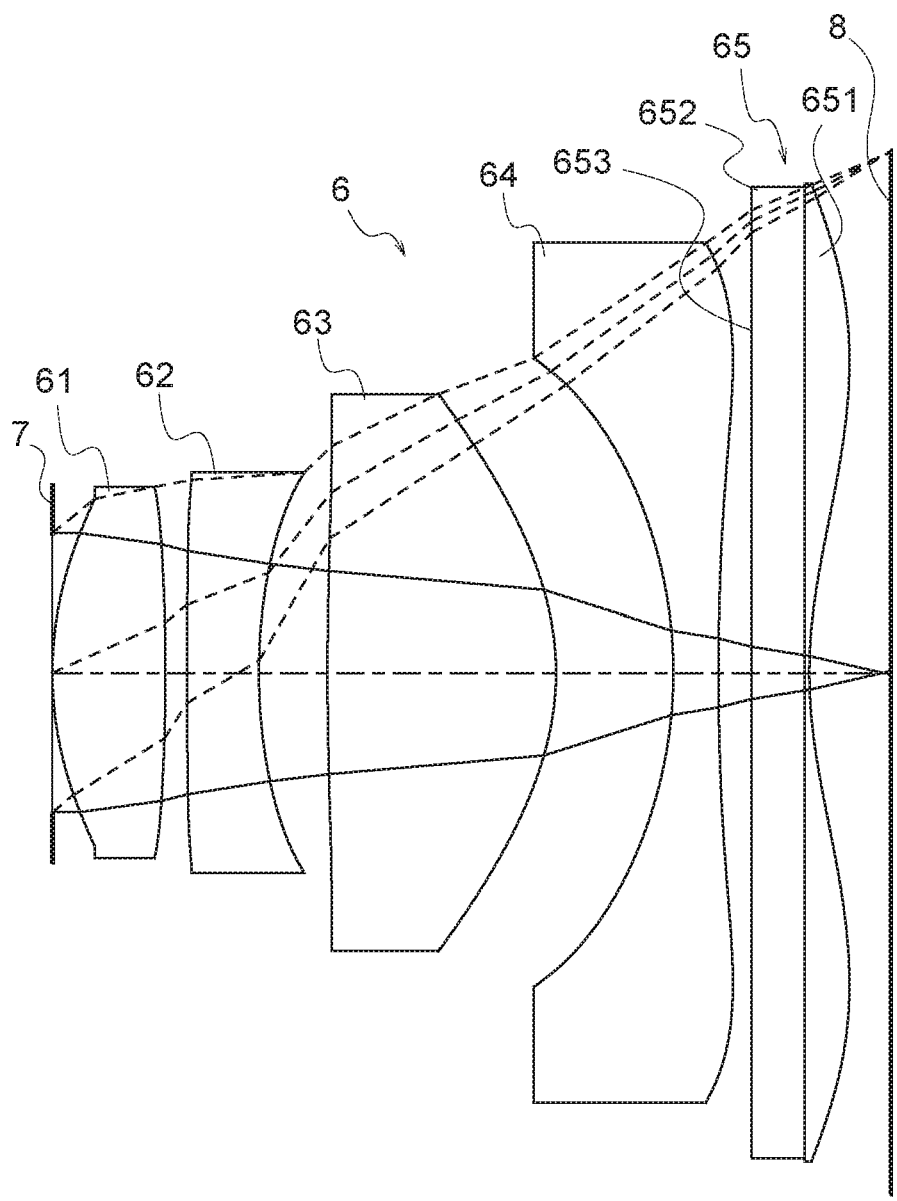
FIG. 11 shows a lens configuration of an imaging lens in a sixth embodiment.

FIG. 11 shows the lens configuration of an imaging lens 6 in the sixth embodiment.

The imaging lens 6 of the sixth embodiment includes, in order from the object side to the image side, a first lens 61 having a positive refractive power, a second lens 62 having a negative refractive power, a third lens 63 having a positive refractive power, a fourth lens 64 having a negative refractive power at the center of the lens and having an inflection point at a position away from the optical axis, and a fifth lens 65 having a negative refractive power at the center of the lens and having an inflection point at a position away from the optical axis.

An aperture 7 with a fixed opening is provided on the object side of the first lens 61. The imaging surface of the imaging lens 6 is provided with an imaging element (image sensor) 8.

The fifth lens 65 in the sixth embodiment is a composite lens composed of a glass substrate 651 made of white glass and a lens portion 652 made of ultraviolet curable resin. Further, an infrared cut film 653 is formed on the front surface of the glass substrate 651 by vacuum evaporation.

The lens data of the numerical embodiment 6 obtained by applying specific numerical values to the imaging lens 6 of the sixth embodiment is shown in Table 26.

TABLE 26

| Optical element | S n | R(mm) | D(mm) | nd | vd |
|---|---|---|---|---|---|
| Aperture | 1 | ∞ | 0.000 | 1.00000 | 0.0 |
| L1 | 2 | 2.011 | 0.640 | 1.54390 | 56.0 |
|  | 3 | −10.840 | 0.122 | 1.00000 | 0.0 |
| L2 | 4 | 53.770 | 0.407 | 1.66130 | 20.4 |
|  | 5 | 3.124 | 0.389 | 1.00000 | 0.0 |

TABLE 26-continued

| Optical element | S n | R(mm) | D(mm) | nd | vd |
|---|---|---|---|---|---|
| L3 | 6 | 19.117 | 1.290 | 1.54390 | 56.0 |
|  | 7 | −1.556 | 0.664 | 1.00000 | 0.0 |
| L4 | 8 | −2.519 | 0.256 | 1.53460 | 56.2 |
|  | 9 | 18.495 | 0.187 | 1.00000 | 0.0 |
| L5(Substrate) | 10 | ∞ | 0.300 | 1.51680 | 64.2 |
| L5(Lens) | 11 | ∞ | 0.027 | 1.56437 | 37.9 |
|  | 12 | 2.772 | 0.466 | 1.00000 | 0.0 |

In the imaging lens 6, among the eleven lens surfaces (the 2nd surface to the 12th surface) of the first lens 61 to the lens portion 652 of the fifth lens 65, each surface except the two surfaces of the glass substrate 651 (the 10th surface and the 11th surface) is an aspheric surface.

The aspherical coefficient of the aspheric surface in the numerical embodiment 6 is shown together with the conic constant k in Table 27, Table 28, and Table 29.

TABLE 27

| Sn | K | A3 | A4 | A5 | A6 | A7 |
|---|---|---|---|---|---|---|
| 2 | −4.7840E−01 | −4.4401E−04 | 2.0605E−04 | 4.0137E−04 | 2.4430E−03 | −1.4565E−03 |
| 3 | 0.0000E+00 | 2.0007E−03 | 6.4904E−03 | 6.3966E−03 | −6.1944E−03 | −9.1652E−03 |
| 4 | 0.0000E+00 | 6.6483E−03 | −1.0169E−02 | 4.2159E−03 | 2.9793E−03 | 2.3254E−03 |
| 5 | 1.0277E+00 | 4.5031E−03 | 7.9906E−05 | −6.2148E−04 | 3.9009E−03 | 3.3137E−03 |
| 6 | 0.0000E+00 | −2.7621E−03 | −1.1219E−03 | −1.0682E−03 | −9.5560E−04 | −5.6512E−04 |
| 7 | −2.2235E+00 | −1.1685E−03 | −2.9896E−03 | −8.5393E−04 | −2.1567E−04 | 2.1443E−05 |
| 8 | −1.9574E+00 | 2.8608E−03 | −9.0566E−03 | −1.1896E−03 | −2.0943E−04 | −1.1036E−03 |
| 9 | 2.5329E+01 | 4.8382E−04 | 9.3431E−03 | −2.4243E−03 | −1.7758E−03 | −3.0066E−04 |
| 12 | −1.1467E+01 | 3.9722E−02 | −5.4082E−02 | 9.8515E−03 | 3.8126E−04 | 1.0447E−03 |

TABLE 28

| Sn | A8 | A9 | A10 | A11 | A12 | A13 |
|---|---|---|---|---|---|---|
| 2 | −8.6186E−03 | −1.1663E−03 | −6.8940E−04 | −1.4694E−04 | −3.4426E−04 | −2.8728E−04 |
| 3 | −4.6423E−03 | 5.7012E−04 | 7.2307E−04 | −7.9639E−04 | −3.3375E−04 | −1.0027E−03 |
| 4 | 6.3797E−04 | 1.0138E−03 | 1.0538E−03 | −1.0736E−04 | −1.3048E−04 | −3.1649E−04 |
| 5 | 4.0676E−03 | −5.7584E−05 | 1.1707E−04 | 5.6026E−04 | 4.2668E−04 | 3.1454E−04 |
| 6 | −3.7399E−04 | −1.2868E−04 | −4.8799E−05 | 1.3761E−05 | 6.6692E−05 | 3.6901E−05 |
| 7 | 4.5127E−05 | 3.9739E−05 | 1.1086E−05 | −2.1970E−06 | 1.4185E−06 | 3.8094E−07 |
| 8 | −1.8338E−04 | −1.4938E−04 | 1.1460E−04 | −1.8784E−05 | −2.7971E−05 | 3.8446E−06 |
| 9 | 5.8852E−05 | 3.8191E−06 | 2.7220E−07 | 4.8738E−06 | 4.2668E−07 | −5.3922E−08 |
| 12 | −4.4782E−04 | −1.4594E−05 | −7.9738E−06 | 7.7022E−07 | 1.8605E−06 | 2.5611E−07 |

TABLE 29

| Sn | A14 | A15 | A16 | A17 | A18 | A19 | A20 |
|---|---|---|---|---|---|---|---|
| 2 | −6.2343E−04 | 8.1555E−05 | 2.2640E−04 |  |  |  |  |
| 3 | 3.7538E−05 | 5.5961E−04 | −2.8862E−04 |  |  |  |  |
| 4 | 1.5076E−04 | −1.4500E−04 | −7.3482E−05 | 3.5533E−04 | −1.6567E−04 | 1.8028E−04 | −1.0412E−04 |
| 5 | 1.5072E−04 | 5.3123E−05 | −1.5073E−04 | −7.4527E−06 | −5.0160E−05 | −1.1570E−04 | −3.2755E−05 |
| 6 | 6.4522E−05 | 1.7315E−05 | 1.1023E−05 | 1.3866E−05 | 1.2977E−06 | −2.8079E−06 | −4.6005E−06 |
| 7 | 1.3027E−06 | 9.5268E−07 | −2.6847E−07 | 1.0025E−07 | −1.5439E−07 | 2.9873E−08 | 1.9949E−08 |
| 8 | −1.0536E−05 | 6.1499E−06 | −2.0067E−06 | 6.1179E−07 | −2.0467E−07 | −1.6129E−08 | −4.5414E−08 |
| 9 | −7.2172E−08 | −2.7927E−08 | −1.8103E−08 | −5.7517E−09 | 1.2939E−09 | −1.8109E−11 | 4.4835E−10 |
| 12 | 3.0121E−08 | 1.5966E−08 | −2.1832E−09 | −4.1265E−10 | −8.0661E−10 | −8.4559E−11 | −3.6474E−11 |

The system focal length, the F number, the total field of view, the maximum image height, the optical total length (TTL) of the imaging lens 6, the focal length f1234 of the composite optical system of the first lens 61 to the fourth lens 64, and the focal length f5 of the fifth lens 65, according to the numerical embodiment 6, are shown in Table 30.

TABLE 30

| f(mm) | 3.60 |
|---|---|
| F number | 2.24 |
| Total field of view (°) | 78.1 |
| Maximum image height (mm) | 2.946 |
| TTL (mm) | 4.736 |
| f1234(mm) | 3.28 |
| f5(mm) | −4.91 |

According to Table 30, since TTL/2ih=0.804 in the numerical embodiment 6, the above condition (1) is satisfied. Further, since ih/f=0.819 in the numerical embodiment 6 according to Table 30, the above condition (2) is satisfied. Further, since f/f1234=1.09 in the numerical embodiment 6 according to Table 30, the above condition (3) is satisfied. Further, since f/f5=−0.73 in the numerical embodiment 6 according to Table 30, the above condition (4) is satisfied.

Figure 12:
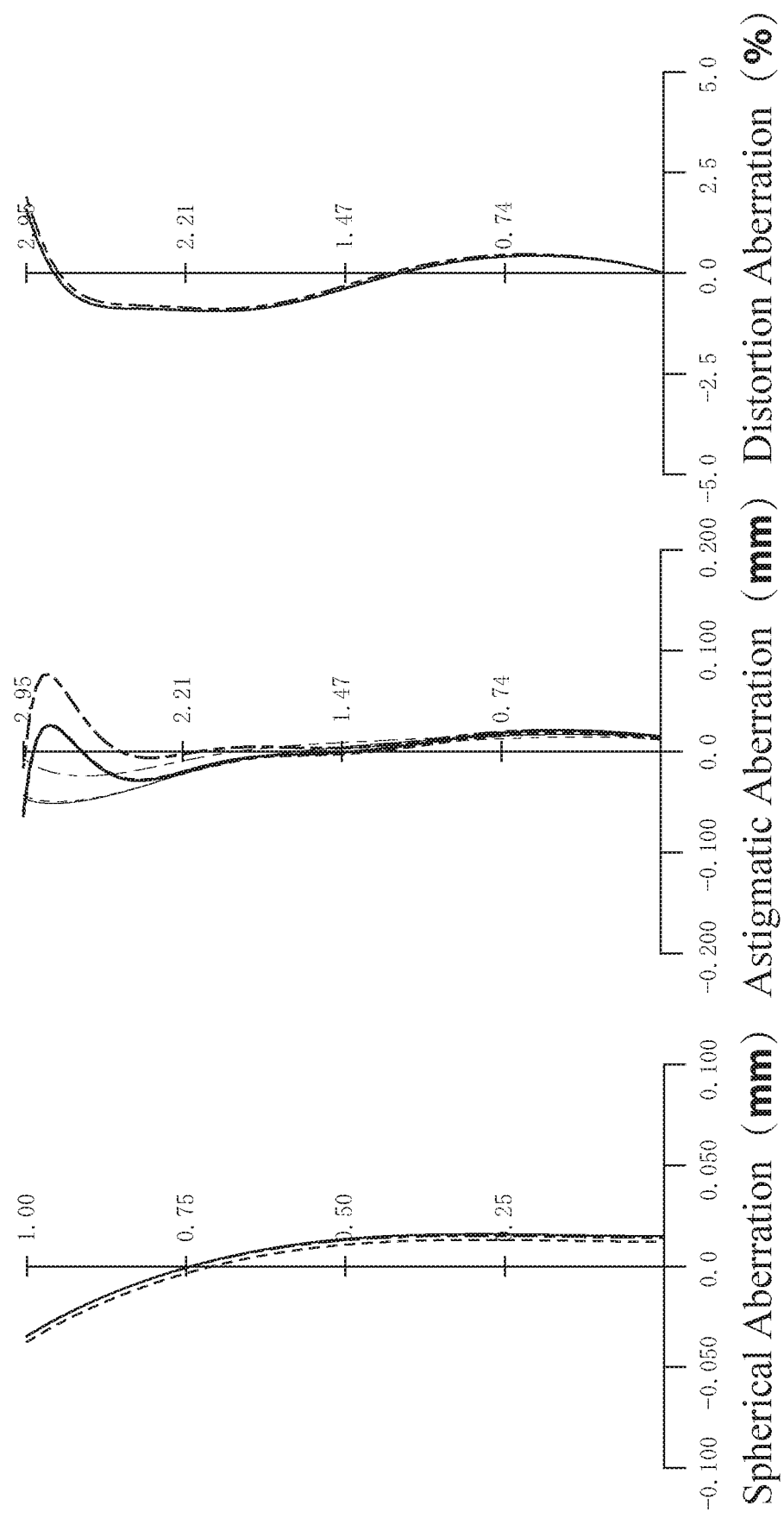
FIG. 12 shows various kinds of aberration diagrams in an infinity in-focus state of a numerical embodiment 6.

FIG. 12 shows various kinds of aberration diagrams in an infinity in-focus state of the numerical embodiment 6.

In FIG. 12, a spherical aberration diagram, an astigmatic aberration diagram, and a distortion aberration diagram are shown.

In the spherical aberration diagram, the astigmatic aberration diagram, and the distortion aberration diagram, the value on the line d (wavelength 587.6 nm) is shown by a dashed line, the value on the line g (wavelength 435.8 nm) is shown by a chain line, the value on the line C (wavelength 656.3 nm) is shown by a solid line. Further, in the astigmatic aberration diagram, the value on the sagittal image plane is shown by a thick line, and the value on the tangential image plane is shown by a thin line.

Further, in the distortion aberration diagram, the lines of the line d, the line g, and the line C are substantially coincident.

It can be inferred from the aberration diagrams that various kinds of the aberrations in the numerical embodiment 6 are all well corrected, and excellent imaging performance is obtained.

[Configuration of the Imaging Device]

The imaging device according to an embodiment includes an imaging lens, and an imaging element configured to convert an optical signal of an image obtained from the imaging lens into an electrical signal. The imaging lens includes, in order from an object side to an image side, a first lens having two opposite surfaces both being convex aspheric surfaces; a second lens being aspherical, the second lens having a concave surface facing towards the image side and having a negative refractive power; a third lens being aspherical, the third lens having a convex surface facing towards the image side and having a positive refractive power; a fourth lens being aspherical, the fourth lens having a concave surface facing towards the image side on an optical axis and having an inflection point at a position near its circumference, and having a negative refractive power; and a fifth lens being aspherical, the fifth lens having a concave rear surface facing towards the image side on the optical axis, the rear surface having an inflection point at a position near its circumference, the fifth lens having a front surface facing towards the object side, the front surface having a smaller curvature than any other lens surface, and the fifth lens serves also as an infrared cut filter.

In other words, the imaging device is configured in a five-lens configuration of positive, negative, positive, negative, and negative. The first lens is a biconvex aspheric lens, the second lens and the third lens are aspheric lenses, and the fourth lens and the fifth lens are aspheric lenses having an inflection point.

Further, in the imaging device, the fifth lens of the imaging lens also serves as an infrared cut filter. In a conventional imaging device, an infrared cut filter is provided between the imaging lens and the imaging surface. Therefore, a long back focal length is required in a conventional imaging lens, which is unfavorable for the reduction in thickness of the imaging lens. On the contrary, in the imaging device of the embodiment, a short back focal length is obtained, thus a small thickness can be realized.

Further, the light transmission property of the fifth lens is preferably as follows: the light transmittance is half value (50%) at any wavelength in a wavelength range of 380 nm to 430 nm, and is 80% or more in a wavelength range of 500 nm to 600 nm, and is 10% or less in a wavelength range of 730 nm to 800 nm.

Further, the front surface of the fifth lens facing towards the object side is a surface with a curvature smaller than any other lens surface. For the shape of the front surface, a plane can be typically employed. When the front surface of the fifth lens is a small curvature surface as described above, it is possible for the rear surface of the fifth lens, which is the last surface of the imaging lens, to have both the function to correct the curvature of field and distortion aberration remaining in the lens group consisting of the first lens to the fourth lens, and the function to correct the chief ray angle (hereinafter referred to as CRA) of the sensor.

If the distance between a correction surface for correcting the curvature of field and the distortion aberration and the imaging surface is too long (for example, assuming that the front surface of the fifth lens is the correction surface and the rear surface is a small curvature surface), the area of the light passing through the correction surface will become larger. In that case, since the correction surface of the fifth lens has an increasing effect on the correction of the curvature of field and the distortion aberration, and the occurrence of the coma aberration cannot be ignored, the shape accuracy tolerance required for the aspherical shape of the correction surface will be very strict. However, since a short design of the back focal length can be realized in the aforementioned imaging device, the shape accuracy tolerance of the fifth lens in correcting the curvature of field and the distortion aberration will be relaxed.

In addition, in order to perform the correction of the CRA, the angle of the light emitted from the rear surface of the fourth lens is adjusted on the correction surface. However, if the distance between the correction surface and the imaging surface is too long (for example, assuming that the front surface of the fifth lens is a correction surface and the rear surface is a small curvature surface), it is necessary to generate a considerable distortion aberration on the lens group consisting of first lens to the fourth lens. Therefore, particularly, the asphencity on the object side of the first lens to the fourth lens will be increased in the form of an exponential function, and the manufacture of the first lens to the fourth lens will become difficult. However, since a short design of the back focal length can be realized in the aforementioned imaging device, the correction of the CRA can be realized.

Further, when the function of the infrared cut filter of the fifth lens is achieved by a filter layer provided by vapor deposition of a metal multilayer film, spin coating of pigment, etc. For the homogenization of the layer, it is necessary to provide the filter layer on a small curvature surface. However, even though the filter layer is provided on the small curvature surface as described above, it is inevitable that the layer is more or less inhomogeneous due to the coating detachment, paint detachment, smearing, or the like.

Assuming that the front surface of the fifth lens is an aberration correction surface composed of an aspheric surface and the rear surface is a small curvature surface having the function of an infrared cut filter, since the distance between the filter layer and the imaging surface is too short, the ratio of "defect area/beam passing area" which is a standard for judging whether a black spot or the like is generated on the image will become larger, which is impractical in terms of manufacturing standards. However, in the aforementioned imaging device, since the front surface of the fifth lens is a small curvature surface and the rear surface is a correction surface, the distance between the filter layer and the imaging surface is increased, and the ratio of "defect area/beam passing area" will become smaller.

Further, the imaging device of the embodiment satisfies the following conditions:

$$TTL/2ih < 0.85; \text{ and} \tag{1}$$

$$0.7 < ih/f < 1.1 \tag{2}$$

wherein TTL is a distance from the object side of the first lens to the image plane on the optical axis; ih is a maximum image height; and f is a focal length of the entire imaging lens system.

The condition (1) defines the ratio of the distance from the object side of the first lens to the image plane on the optical axis which is generally referred to as an optical total length of an imaging lens, to the maximum image height.

If the imaging lens does not satisfy the condition (1), the maximum image height will become too small, or the optical total length will become too long. If the maximum image height becomes too small, the field of view of the imaging lens is insufficient, and the function as a wide-angle lens of the disclosure will be impaired. In addition, if the optical total length becomes too long, it will be difficult to realize a small thickness in the imaging lens.

The condition (2) is an expression that defines the ratio of the maximum image height to the focal length of the entire imaging lens system (hereinafter, also referred to as "system focal length").

If ih/f of the condition (2) corresponding to the imaging lens is lower than the lower limit of the condition (2), the system focal length will become too long, or the maximum image height will become too small. If the system focal length becomes too long, the field of view tends to be insufficient, and the optical total length tends to be elongated, and it is difficult to realize a small thickness and a large caliber of the imaging lens. In addition, if the maximum image height becomes too small, it is difficult to realize a large caliber of the imaging lens as described above.

On the contrary, if ih/f of the condition (2) corresponding to the imaging lens is higher than the upper limit of the condition (2), the system focal length will become too short, or the maximum image height will become too large, and it is difficult to achieve high performance in aberration and imaging performance of the imaging lens.

Therefore, a small thickness, a large caliber, and high performance in aberration and imaging performance of the imaging lens can be obtained by satisfying the conditions (1) and (2).

Figure 13:
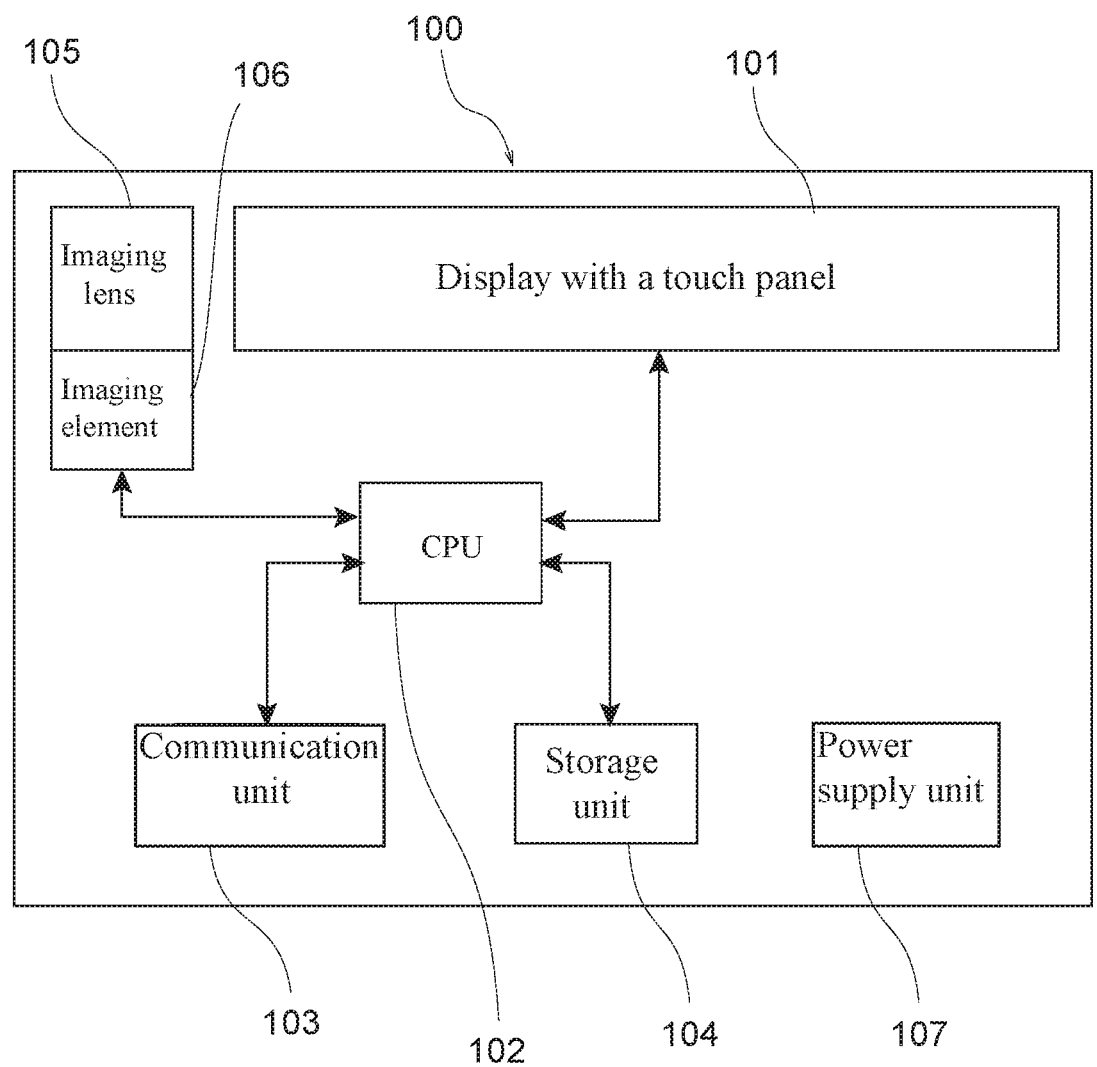
FIG. 13 is a block diagram of a smart phone corresponding to an embodiment.

FIG. 13 is a block diagram of a smart phone corresponding to an embodiment.

The smart phone 100 includes: a display 101 with a touch panel function as a display unit and an input unit; a CPU (Central Processing Unit) 102 configured to perform input/output of information via the display 101, various information processing and control processing and the like; a communication unit 103 configured to perform telephone communication and Wi-Fi communication and the like under the control of the CPU 102; a storage unit 104 configured to store various kinds of information; an imaging lens 105 according to the above-described embodiments; an imaging element (image sensor) 106 configured to convert an optical signal of the image obtained by the imaging lens 105 into an electrical signal; and a power supply unit 107 configured to supply electric power to each part of the smart phone 100.

The electric signal obtained by converting the optical signal of the image through the imaging element 106 is input as image data into the CPU 102 and is subjected to various signal processing and image processing. Further, in accordance with the user instruction input via the display 101, the image data is displayed on the display 101, stored in the storage unit 104, or transmitted via the communication unit 103.

Further, in the above description, the smart phone is exemplified as an embodiment, and the imaging device may also be a mobile terminal such as a tablet computer and a notebook computer, and may also be a digital camera.

The foregoing implementations are merely specific embodiments of the present disclosure, and are not intended to limit the protection scope of the present disclosure. It should be noted that any variation or replacement readily figured out by persons skilled in the art within the technical scope disclosed in the present disclosure shall all fall into the protection scope of the present disclosure. Therefore, the protection scope of the present disclosure shall be subject to the protection scope of the claims.

What is claimed is:

1. An imaging lens, comprising: in order from an object side to an image side,
   a first lens having two opposite surfaces both being convex aspheric surfaces on an optical axis;
   a second lens being aspherical, the second lens having a concave surface facing towards the image side on the optical axis and having a negative refractive power on the optical axis;
   a third lens being aspherical, the third lens having a convex surface facing towards the image side on the optical axis and having a positive refractive power on the optical axis;
   a fourth lens being aspherical, the fourth lens having a concave surface facing towards the image side on the optical axis and an inflection point at a position near its circumference, the fourth lens having a negative refractive power on the optical axis; and
   a fifth lens having an aspherical concave rear surface facing towards the image side on the optical axis, the rear surface having an inflection point at a position near its circumference, the fifth lens having a front surface facing towards the object side, the front surface having a smaller curvature than any other lens surface,
   wherein the imaging lens satisfies the following conditions:

$$TTL/2ih<0.85; \quad (1)$$

$$0.7<ih/f<1.1; \quad (2)$$

$$-1.5 \leq f/f5<0, \quad (3)$$

wherein TTL is a distance from the object side of the first lens to the image plane on the optical axis; ih is a maximum image height; f is a focal length of the entire imaging lens system; and f5 is a focal length of the fifth lens characterized in that the imaging lens further satisfies the following condition;

$$1<f/f1234<1.3, \quad (4)$$

wherein f1234 is a combined focal length of the first lens, the second lens, the third lens, and the fourth lens; and the fifth lens serves also as an infrared cut filter.

2. The imaging lens according to claim 1, wherein the fifth lens serves as an infrared cut filter by the material of the fifth lens.

3. The imaging lens according to claim 1, wherein the fifth lens serves as an infrared cut filter by an infrared cut layer provided on a front surface thereof.

4. The imaging lens according to claim 1, wherein the fifth lens is a composite lens composed of a substrate portion located on the object side and an aspheric lens portion located on the image side.

5. An imaging device comprising an imaging lens according to claim 1, and an imaging element configured to convert an optical signal of an image obtained from the imaging lens into an electrical signal.

* * * * *